(12) United States Patent
Cameron

(10) Patent No.: US 8,478,576 B1
(45) Date of Patent: Jul. 2, 2013

(54) INCLUDING VARIABILITY IN SIMULATION OF LOGIC CIRCUITS

(76) Inventor: Donald Kevin Cameron, Sunnyvale, CA (US)

( * ) Notice: Subject to any disclaimer, the term of this patent is extended or adjusted under 35 U.S.C. 154(b) by 331 days.

(21) Appl. No.: 13/029,625

(22) Filed: Feb. 17, 2011

Related U.S. Application Data

(60) Provisional application No. 61/310,670, filed on Mar. 4, 2010.

(51) Int. Cl.
*G06F 17/50* (2006.01)
*G06G 7/62* (2006.01)

(52) U.S. Cl.
USPC .............................................. 703/14; 703/13

(58) Field of Classification Search
USPC ................................................... 703/13–14
See application file for complete search history.

(56) References Cited

U.S. PATENT DOCUMENTS

| | | | |
|---|---|---|---|
| 5,383,167 A | 1/1995 | Weil | |
| 6,253,165 B1 * | 6/2001 | Malvar | 703/2 |
| 7,197,728 B2 * | 3/2007 | Yonezawa | 716/56 |
| 7,239,997 B2 | 7/2007 | Yonezawa | |
| 7,913,214 B2 * | 3/2011 | Yamada | 716/113 |
| 2009/0112560 A1 * | 4/2009 | Woodbury | 703/17 |

\* cited by examiner

*Primary Examiner* — Mary C Jacob
*Assistant Examiner* — Aniss Chad
(74) *Attorney, Agent, or Firm* — Raubvogel Law Office

(57) ABSTRACT

According to various techniques of the present invention, probability models for circuit simulation are generated as linear, piecewise linear, nonlinear, and/or continuous probability waveforms. These waveforms represent probability values for logic levels over some period of time. Probability models are defined according to characteristics of the electronic components being modeled, so as to capture variability in characteristics and performance of logic circuits and their components. The probability waveforms of the present invention can be used to predict circuit component behavior resulting from state changes; a range in response time can be indicated by a probability waveform indicating the probability that the response has taken place at a given time after an input state change. Construction of a probability model for a circuit with interconnected electronic components allows timing problems resulting from variability in component performance to be identified.

35 Claims, 16 Drawing Sheets

INCLUDING VARIABILITY IN SIMULATION OF LOGIC CIRCUITS

CROSS-REFERENCE TO RELATED APPLICATIONS

This application claims priority from U.S. Provisional Patent Application Ser. No. 61/310,670 for "Method for Including Manufacturing Variation in Simulation of Logic Circuits", filed Mar. 4, 2010, which is incorporated herein by reference.

FIELD OF THE INVENTION

The present invention relates to simulation of logic circuits, and more particularly to improved systems and methods of including variability in such simulation.

DESCRIPTION OF THE RELATED ART

Software applications for simulating electronic logic circuits provide a way to predict the behavior of actual physical devices and circuits. Such simulation can be useful because it allows a circuit designer to gain insight into the behavior of the circuit before it has been built, and to make adjustments as needed to correct flaws, improve performance and efficiency, and compare alternative designs. Circuit simulation allows such analysis to take place without the time-consuming and expensive process of generating multiple photomasks for building actual circuits. In addition, circuit simulation can provide the ability to probe the behavior of internal signals where such probing might not be possible when analyzing actual physical devices. Accordingly, circuit simulation is often viewed as an essential element of circuit design.

In general, circuit simulators fail to adequately take into account non-uniformity in operational characteristics of physical devices. Manufacturing variability is an inherent characteristic of mass-produced logic circuits. Such variability can come from any of a number of sources. For example, precision is limited when making semiconductor devices using optical lithography at nanometer size, and methods like ion-implant and diffusion used to add dopants can be inconsistent over adjacent areas at the scale of such devices. As a result, equivalent devices in a design may have significantly different operational characteristics when actually manufactured. Performance may vary among devices, even when such devices are on the same physical chip.

Other factors may also contribute to non-uniformity in operational characteristics. For example, many modern designs use power management to combat high-leakage currents in circuits that are only needed on a part-time basis. As a result, the voltage that powers the logic gates in such circuits can vary over time, and can even vary among instances of the same logic cell; such variations can affect the speed of the gates. Large designs can also have non-uniform temperature profiles, and transistor performance varies considerably with temperature. Static timing analysis does not generally take into account the effects of hot-spots and supply voltage droop.

In general, the inability of conventional circuit simulators to adequately take into account such sources of variability can lead to designs that fail to meet their specified speeds and/or other operational specifications in practice.

Global modeling of timing variations is, in general, insufficient to properly capture variability in component performance. If a circuit simulator considers all devices to be at minimum, maximum, or typical speed, it will fail to account for instances in which some devices are at one end of the range while others are at the other end. Thus, global modeling is not able to properly predict performance in all situations. In addition, global modeling may fail to consider localized effects of power supply variation and temperature.

Furthermore, modern digital circuitry having high direct current densities is particularly susceptible to failure caused by electromigration. Static analysis of circuits does not provide any good indication of which electrical connections are likely to fail and what the mean-time-to-failure will be.

In U.S. Pat. No. 5,383,167, Weil describes a histogram-based digital circuit simulator in which signal level transitions and component gate delays are represented by segmented probability distributions, or histograms. These histograms are divided into sub-ranges, each of which has a defined probability associated with it. Weil attempts to use such histograms to identify and report signal conflicts due to timing problems, and to report probabilities with such signal conflicts.

Existing segmented approaches can become unwieldy, however, when a circuit having several components is to be modeled, wherein the outputs of some components are to be used as inputs to other components. In such a situation, segmented probability distributions can multiply rapidly so as to become unmanageable and ineffective at generating meaningful predictions of circuit behavior.

What is needed is a system and method of modeling logic circuits that takes into account various sources of variability in component performance, and which avoids the limitations of conventional circuit simulation.

SUMMARY

According to various embodiments of the present invention, a software-based circuit simulator creates individual models for each of a number of electronic components and/or logic circuits. The electronic components can be discrete physical components and/or constituent parts of a design of an integrated circuit. For example, constituent parts of an integrated circuit can include resistors, capacitors, inductors and active devices (transistors and diodes), and the like. Logic circuits can include any defined arrangement of electronic components.

Based on device-level circuit descriptions and/or other available information about logic circuits and their components (such as information from manufacturers' process design kits (PDKs)), components and circuits are characterized across variations in transistors, supply voltage and temperature. Data from such characterization is used to create individual models for each logic circuit and/or component in the design, and/or common models with specific parameterization for each instance.

In one embodiment, the models generated by the techniques of the present invention are characterized by linear, piecewise linear, nonlinear, and/or continuous probability waveforms. These waveforms represent probability values for logic levels over some period of time; specifically, each probability value at a given time represents the probability that a particular signal will be at a particular value at a particular time. The signals can correspond to inputs, outputs, or any internal or external wire or lead associated with a circuit component. For example, for a lead having two theoretical logic levels (high and low), the probability value can represent the probability that the lead has a value of "high" at any given time. The probability waveforms of the present invention can thus be used to predict circuit component behavior resulting from state changes; a range in response time can be indicated by a probability waveform indicating the probability that the response has taken place at a given time after an input state change.

The models generated by the techniques of the present invention are referred to herein as "probability models." According to various techniques of the present invention, probability models are defined according to characteristics of the electronic components being modeled. The probability models can be defined, for example, as a function of any number of factors, including input logic levels, logic probability signals, supply voltage and/or temperature, or any combination thereof. In one embodiment, component models are hybrid mixed-signal models that are able to feed data describing power levels into the thermal model for the entire design and current load into the power supply network for the circuit. Each model can use any number of functions to calculate the behavior of its outputs. In one embodiment, outputs of component models are converted to values represented by piecewise-linear (PWL) functions (or other higher-order functions, such as continuous functions) for use by a simulator. Any simulator that supports mixed-signal (logic, PWL, and/or continuous waveforms), and/or user-defined signal types, can be used. Examples include any simulator supporting the Verilog-AMS (Analog Mixed-Signal) language, analog event-driven/relaxation simulators such as IRSIM, and the like.

According to various techniques of the present invention, the probability models of the present invention can capture variability in characteristics and performance of logic circuits and their components. Variability can result from any of a number of factors, including for example manufacturing variation, operating characteristics, environmental conditions, and the like. The system of the present invention is able to capture variations due to conditions that affect all components similarly (such as temperature variations), as well as variations that may be specific to individual components (such as non-uniformity resulting from manufacturing variations). Any combination of such "global" and "local" variations can be modeled using the techniques of the present invention.

By modeling components so that their output is represented using PWL and/or continuous probability functions, the system and method of the present invention are able to more accurately predict the behavior of logic circuits and to take into account non-uniformity in operational characteristics of physical devices. Timing problems resulting from variability in component performance can be identified.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

Various embodiments of the present invention will now be described in connection with the Figures. One skilled in the art will recognize that the following descriptions are intended to be exemplary, and that the present invention can be implemented in many other ways without departing from the essential characteristics as set forth in the claims. Accordingly, the following description is intended to illustrate various embodiments of the invention by way of example, rather than to limit the scope of the claimed invention.

System Architecture

According to various embodiments, the present invention can be implemented on any electronic device or electronic network comprising any number of electronic devices. Each such electronic device may include any number of processors for performing instructions specified in software. Each such electronic device may be, for example, a desktop computer, laptop computer, personal digital assistant (PDA), cellular telephone, smartphone, music player, handheld computer, tablet computer, kiosk, game system, or the like. An electronic network enabling communication among two or more electronic devices may be implemented using well-known network protocols such as Hypertext Transfer Protocol (HTTP), Secure Hypertext Transfer Protocol (SHTTP), Transmission Control Protocol/Internet Protocol (TCP/IP), and/or the like. Such a network may be, for example, the Internet or an Intranet. Secure access to the network may be facilitated via well known techniques such as a Virtual Private Network (VPN).

In one embodiment, the present invention is implemented as a software application running on a computing device. In another embodiment, the present invention is implemented as a software application running in a client/server environment comprising at least one server and at least one client machine. For example, the invention can be implemented as a web-enabled application in which web pages are transmitted from a server to a computing device, and viewed on the computing device via a browser or other software application. Alternatively, the techniques described herein can be implemented on any other type of computing device, combination of devices, or platform.

Figure 7:
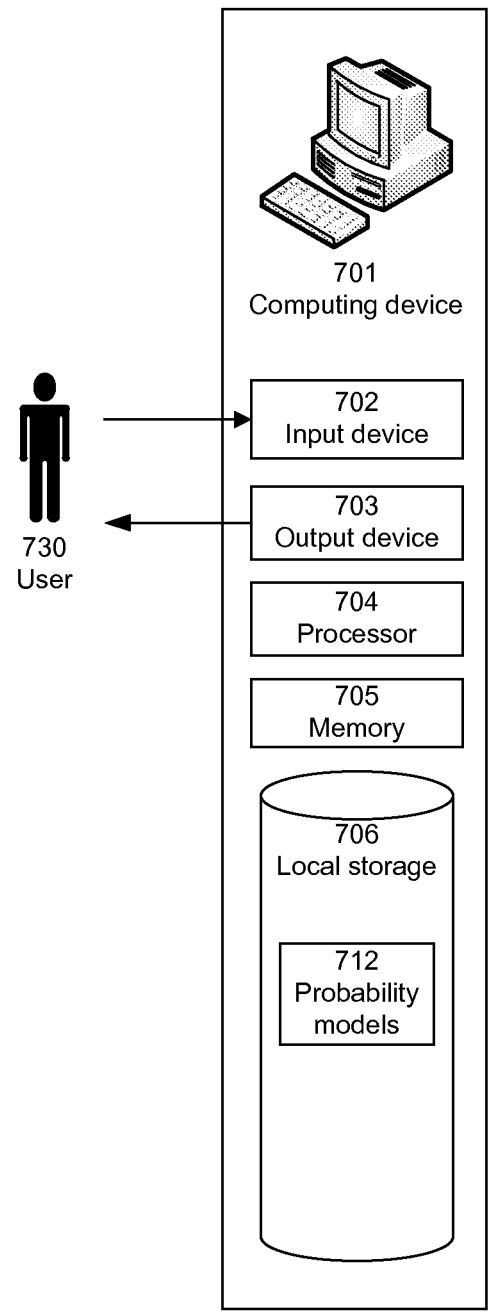
FIG. 7 is a block diagram depicting a hardware architecture for practicing the present invention as software running in a computing device according to one embodiment.

Referring now to FIG. 7, there is shown a block diagram depicting a hardware architecture for practicing the present invention according to one embodiment. Such an architecture can be used, for example, for implementing the techniques of the present invention in connection with a stand-alone software application running on a computer. Computing device 701 may be any electronic device adapted to run software; for example, computing device 701 may be a desktop computer, laptop computer, personal digital assistant (PDA), cellular telephone, smartphone, music player, handheld computer, tablet computer, kiosk, game system, or the like. In one embodiment, computing device 701 is a desktop computer running an operating system such as Microsoft Windows, available from Microsoft Corporation of Redmond, Wash., or Mac OS X, available from Apple Inc. of Cupertino, Calif., or iOS, available from Apple Inc. of Cupertino, Calif.

The techniques of the present invention can be implemented as a software application running on computing device 701 according to well-known techniques. The software application may be a desktop application or a web-based application that is accessible via a browser such as Microsoft Internet Explorer, available from Microsoft Corporation of Redmond, Wash., or by a specialized web-based client application. In one embodiment, the system of the present invention can be implemented using any known software application for modeling circuits. Circuits to be simulated using the techniques of the present invention can be described using any known hardware description language (HDL), such as for example Verilog or VHSIC hardware description language (VHDL), or the like.

In one embodiment, computing device 701 comprises a number of hardware components as are well known to those skilled in the art. User 730 interacts with device 701 using input device 702 and views output via output device 703. Input device 702 can be a keyboard, mouse, touchscreen, trackball, trackpad, five-way switch, voice input device, joystick, and/or any combination thereof. Output device 703 can be a screen, speaker, printer, and/or any combination thereof. Processor 704 can be a conventional microprocessor for performing operations on data under the direction of software, according to well-known techniques. Memory 705 can be random-access memory having a structure and architecture as are known in the art, for use by processor 704 in the course of running software. Local storage 706 can be any magnetic, optical, and/or electrical storage device for storage of data in digital form; examples include flash memory, magnetic hard drive, CD-ROM, and/or the like. In one embodiment, local storage 706 includes dictionary 712, which is a list of words and/or phrases that can be matched against user-entered text for automatic creation of health-related data objects, as described in more detail below.

One skilled in the art will recognize that the particular arrangement of hardware elements shown in FIG. 7 is merely exemplary, and that the invention can be implemented using different hardware elements configured in any of a number of different ways. Thus, the particular architecture shown in FIG. 7 is merely illustrative and is not intended to limit the scope of the invention in any way.

Figure 8:
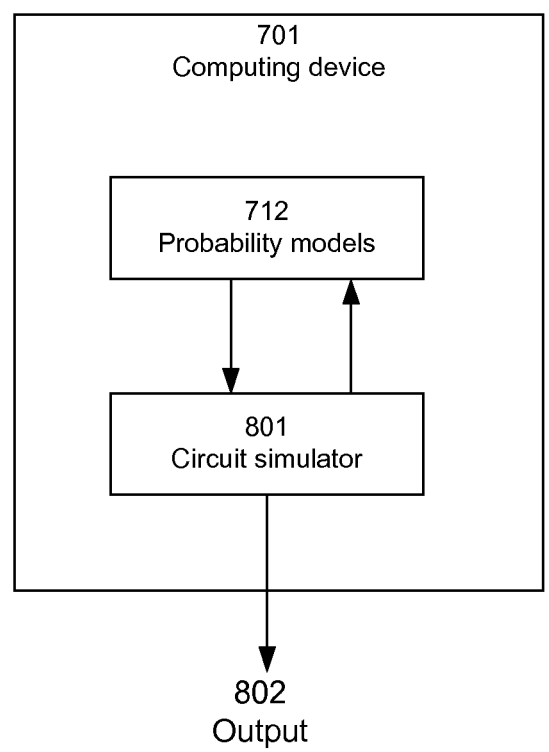
FIG. 8 is a block diagram depicting a conceptual architecture for practicing the present invention according to one embodiment.

Referring now to FIG. 8, there is shown a block diagram depicting a conceptual architecture for practicing the present invention according to one embodiment. Circuit simulator 801, which may be implemented as a software application, uses probability models 712 representing circuits to generate output 802. Output 802 can be presented in any format, depending on the nature of output device 703; for example, output 802 can be presented as a report generated on paper, on a screen, or in some other medium; alternatively, output 802 can be a report that is stored and/or transmitted in a computing network, according to well known mechanisms. In one embodiment output 802 is a report that predicts the behavior of a modeled circuit in various operating conditions.

Logic and Probability Modeling

A simplified representation of a digital logic circuit generally represents signal values in terms of a binary definition: signal values can be "false" or "true". For illustrative purposes, these values can be represented in numeric terms, with 0 representing "false" and 1 representing "true". An unknown signal value can be presented as "X".

In one embodiment, the system of the present invention employs a probabilistic model that takes into account the operational characteristics of electronic components in circuit simulation. This probabilistic model accounts for the fact that the precise timing of a transition from 1 to 0, or vice versa, in an electronic component is not known. In fact, in many cases, the transition is not instantaneous and takes place over some period of time.

Accordingly, the system of the present invention generates logic probability signals for simulated circuits. A logic probability signal is the probability that a signal at a lead (or wire) of a circuit is at a particular value (such as 1) at a given time. The specific characteristics of a particular logic probability signal for an electronic component can be based on known static and/or dynamic operational characteristics for the component, and can be standardized or parameterized as appropriate. Such operational characteristics can be obtained, for example, by measurement of randomly sampled actual physical devices. Operational characteristics can be obtained, for example, to the transistor level, or to any desired level of granularity. Such characteristics can take into account manufacturing variations, variability due to temperature fluctuation, and/or any other factors.

One well known technique for deriving operational characteristics for circuit components is by the use of Monte Carlo simulations, wherein a large set of circuit instantiations are simulated using randomly varied devices. According to one embodiment, the present invention removes the need to perform Monte Carlo simulations above the cell level, since cells can be simulated using their own individual probability models, which are generated with the help of Monte Carlo simulations at the transistor level. Thus, the number of simulations can be reduced, since blocks made up from cells that have probabilistic models need not be subjected to Monte Carlo simulation. In addition, timing data from Verilog minimum/typical/maximum timing and/or SDF (Standard Delay Format) timing data can be used to obtain a timing spread, as well as additional data from STA (static Timing Analysis). One skilled in the art will recognize that other techniques can be used for deriving operational characteristics.

The system of the present invention is able to capture variations due to conditions that affect all components similarly (such as temperature variations), as well as variations that may be specific to individual components (such as non-uniformity resulting from manufacturing variations). Any combination of such "global" and "local" variations can be modeled using the techniques of the present invention. In various embodiments, the system of the present invention can be configured so that it accurately models situations wherein some components are operating at a relatively fast response time, while other components (whether on the same physical chip or not) may be operating at a relatively slow response time. No assumption need be made that variability for a particular circuit affects all components similarly. The system of the present invention can take into account variations due to dynamic conditions; thus, factors such as load, power supply characteristics, and the like, can be taken into account even when they change over time.

Figure 11A:
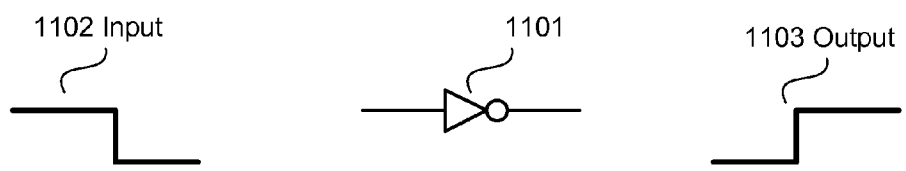
FIG. 11A depicts an example of an inverter having output characteristics that can be modeled according to one embodiment of the present invention.
Figure 11B:
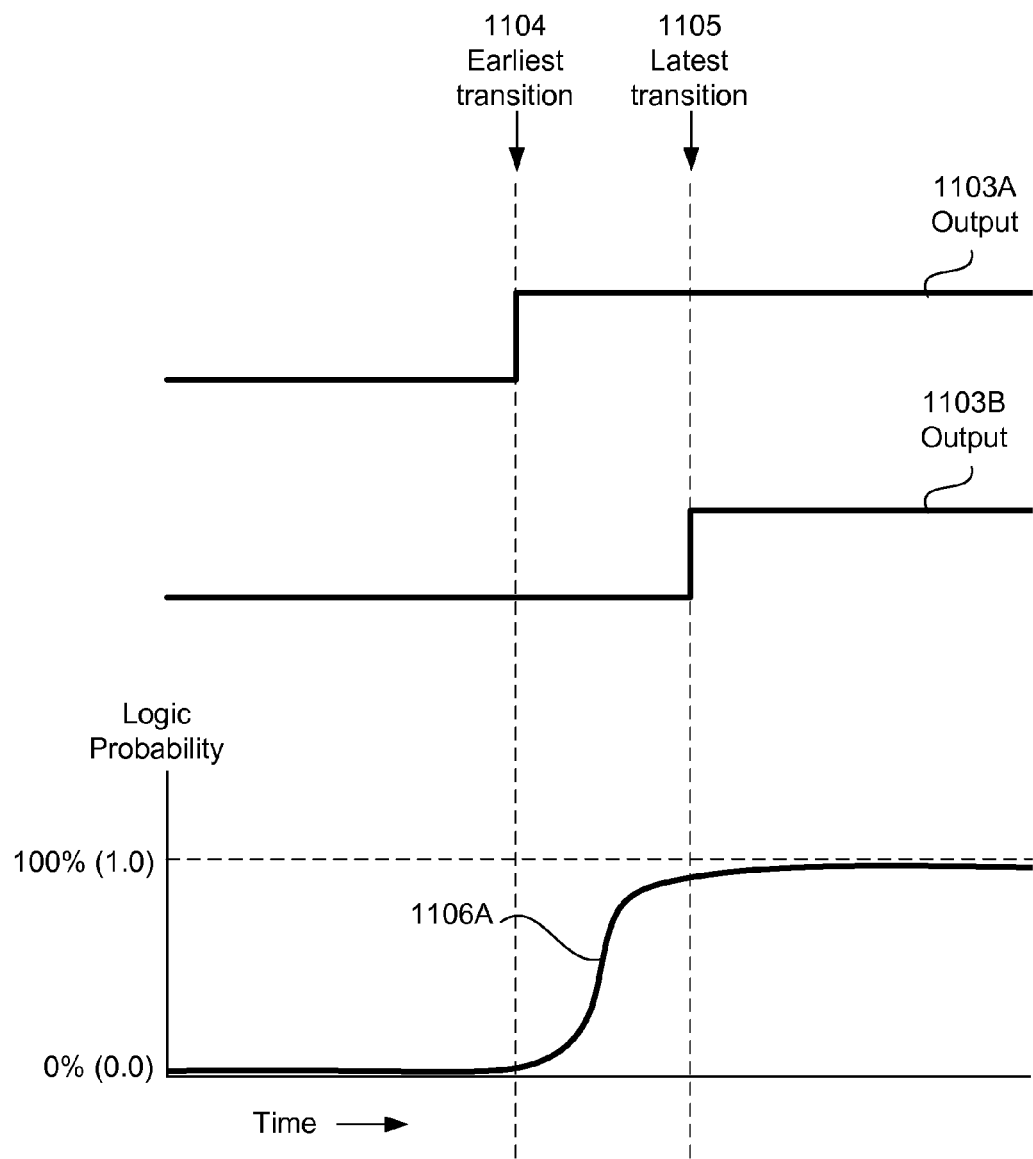
FIG. 11B depicts an example of a continuous logic probability waveform for an inverter generated according to one embodiment of the present invention.

One representation of the logic probability signal for an electronic component is a real-valued function representing the probability that a signal at a lead has a value of 1 at a particular point in time. Referring now to FIG. 11A, there is shown an example of an inverter 1101 (NOT gate) having output characteristics that can be modeled according to one embodiment of the present invention. Inverter 1101 takes input signal 1102 and generates output signal 1103. Because of variability resulting from manufacturing, temperature fluctuations, and other sources, the time it takes for inverter 1101 to transition from a 0 output to a 1 output may not be precisely known. As shown in FIG. 11B, two possible output signals 1103A, 1103B are depicted, representing an earliest possible transition 1104 and a latest possible transition 1105. These two limiting cases can be established, for example, by deriving operational characteristics for inverter 1101, for example using Monte Carlo simulations and/or other means.

FIG. 11B depicts an example of continuous logic probability waveform 1106A for inverter 1101, wherein the value of waveform 1106A at a given point in time represents the probability that inventor 1101 has completed the transition to a 1 output value. As shown in the graph of FIG. 11B, signal 1106A is represented as a continuous curve that starts at or near 0% (0.0) and ends at or near 100% (1.0). The transition from near-0 to near-1 takes place between the time corresponding to earliest possible transition 1104 and the time corresponding to latest possible transition 1105. As depicted, the value does not actually reach 1 in this example because of the possibility that the component is defective, in which case the value will never be reached. Similarly, the example shows the value starting just about 0, and not at 0, because of the possibility that a defective component can get "stuck" in the high position. In some cases, such as situations where a circuit is being designed, it may be preferable to ignore the possibility of manufacturing failure and assume 0/100% probability levels at the earliest and latest logic transitions. In addition, variable load can be modeled by using flow, in those analog simulators that support it. The equivalent of a voltage source (potential) can be used to represent probability, and current (flow) measured at an output lead represents load.

Figure 11C:
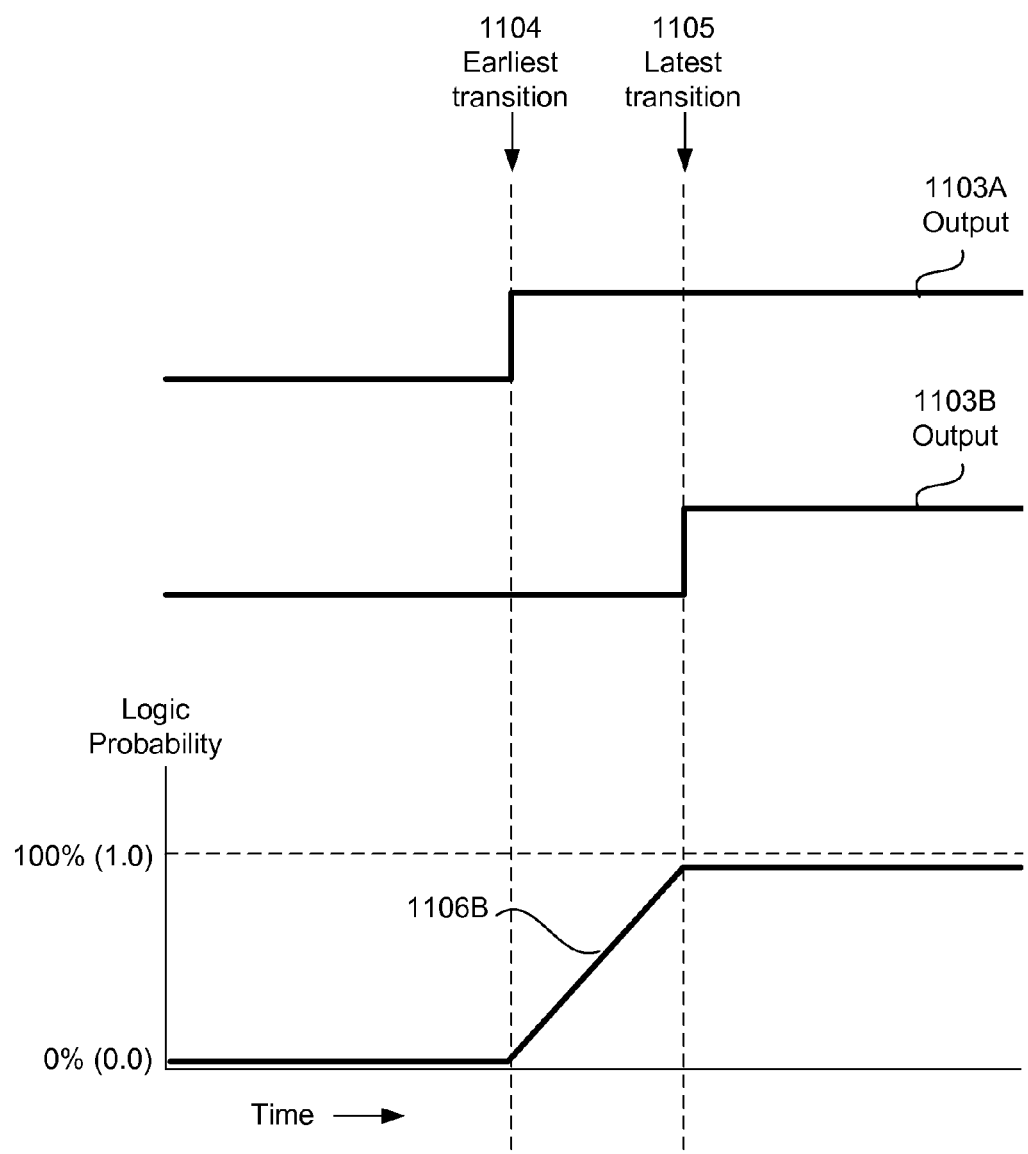
FIG. 11C depicts an example of a linear logic probability waveform for an inverter generated according to one embodiment of the present invention.

Referring now to FIG. 11C, there is shown an alternative example of logic probability waveform 1106B for inverter 1101, wherein the waveform is a linear function. Such a waveform can be generated, for example, using linear interpolation based on the earliest and latest possible transition times for inverter 1101. In one embodiment, such a linear function can be used as an approximation of a continuous waveform.

Figure 11D:
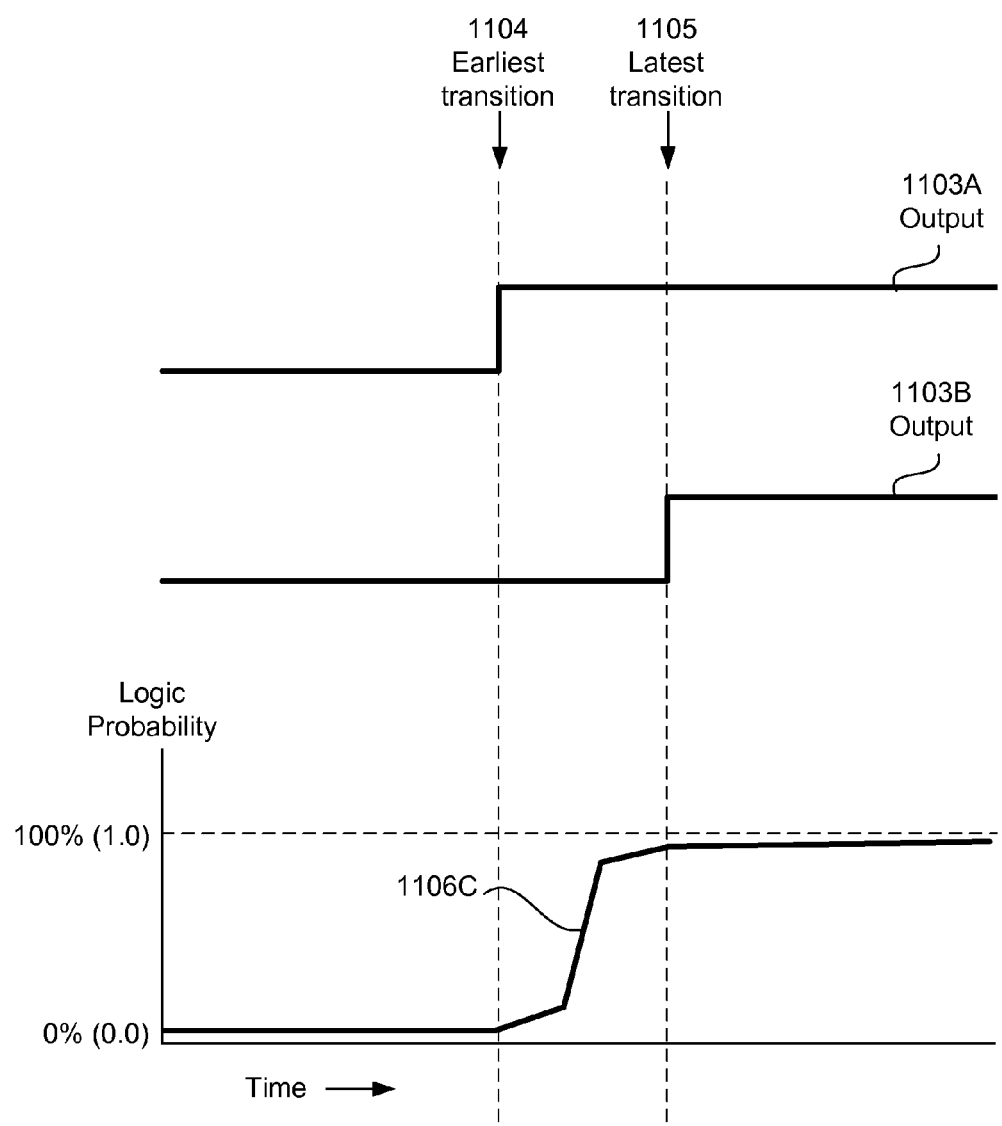
FIG. 11D depicts an example of a piecewise linear logic probability waveform for an inverter generated according to one embodiment of the present invention.

Referring now to FIG. 11D, there is shown an alternative example of logic probability waveform 1106C for inverter 1101, wherein the waveform is a piecewise linear (PWL) function. Such a waveform can be generated, for example, using linear interpolation between known intermediate probability values. In one embodiment, such a piecewise linear function can be used as an approximation of a continuous waveform.

One skilled in the art will recognize that the techniques of the present invention can be used to generate logic probability waveforms of any type, including for example continuous, linear, nonlinear, and/or piecewise linear waveforms.

In one embodiment, the system and method of the present invention can generate probability signals 1106 for any of a number of electrical components and/or combinations of components. In circuits involving two or more components, the probability signals 1106 for the various components can be combined with one another according to the topography of the circuit, so as to generate accurate probability signals 1106 at the output leads of components based on probability signals 1106 at their respective input leads.

Figure 3:
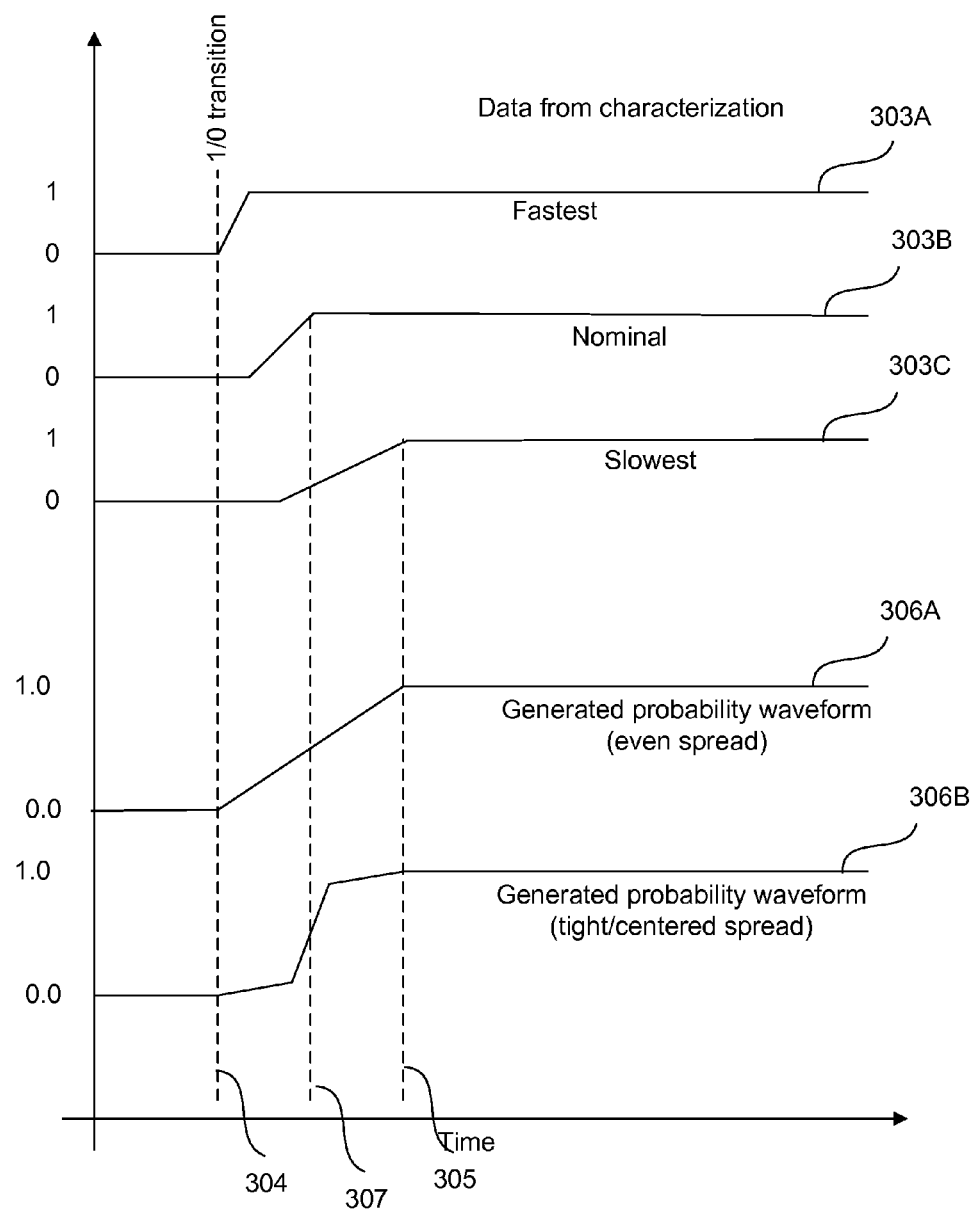
FIG. 3 is a set of graphs depicting waveforms representing transitions for electronic components having different characteristics.

Referring now to FIG. 3, there are shown various possible waveforms representing transitions for electronic components having different characteristics. Output signals 303A, 303B, and 303C depict three different output waveforms, depending on particular characteristics of the electronic component. These signals 303A, 303B, and 303C are not probability waveforms, but are the actual expected output signal observed when simulating the electronic component or circuit. In simulation, such signals 303A, 303B, and 303C can be determined based on an obtained characterization of the electronic component. Specifically, signal 303A represents the fastest transition from 0 to 1, signal 303B represents a transition taking place at nominal speed, and signal 303C represents the slowest transition. These signals 303 can represent, for example, the observed range of performance for the electronic component. Time 304 represents the time that the input signal changes, which is the earliest possible time at which the output transition could take place. Time 305 corresponds to the slowest observed transition, and time 307 corresponds to a median transition time.

Logic probability signal 306A depicts a probability waveform generated from output signals 303A, 303B, and 303C according to one embodiment. The probability waveform starts changing from 0.0 at the earliest time at which a "0 to 1" transition is possible and reaches (or nears) 1.0 at the last time the transition is possible. Thus, probability signal 306A indicates, for a given point in time, the probability that the transition has taken place.

The probability spread representing variations among component performance may be uniform or non-uniform. For uniform probability spread, the probability waveform can be generated by simple linear interpolation. For example, signal 306A represents a linear transformation corresponding to an assumption that electronic component performance varies linearly along the range from fastest to slowest.

In the case where the probability spread is non-uniform, the probability waveform may be specified using a complex continuous function such as a multiterm polynomial, standard bell curve, or the like. Such a waveform may be approximated by a piecewise linear (PWL) function. Accordingly, in the example of FIG. 3, signal 306B represents a piecewise linear (PWL) waveform corresponding to an assumption that electronic component performance tends to be centered around the nominal measured characteristics. In the case where the simulator can use higher-order functions, the model may be described using such higher-order functions.

In various embodiments, any type of PWL and/or continuous signals can be generated, based on measured, observed, and/or estimated characteristics of electronic components and further based on simulator capabilities. The selection of waveform can be reflected, for example, as a choice among any number of templates. Thus, for any given gate, there may be multiple available templates of varying complexity. Selection of template may be made based on any applicable factors, such as for example relative computational complexity. Thus, the least computationally intensive waveform which can be parameterized to fit the data reasonably accurately may be used. In other embodiments, table models can be used as the means of calculation.

In cases where a user-defined signal model can be used, (for example, when using VHDL), signal 306 may be representative of output signal 303 having three dimensions: strength, certainty, and value. In such an environment, for example, unpowered logic may use a strength level of zero (undriven) rather than a certainty of zero. A certainty level of zero (entirely unknown) corresponds to a probability of 50% (i.e., a probability signal 306 having a value of 0.5), while probability signal 306 values of 0.0 or 1.0 indicate 100% certainty.

When using non-mixed signal capable simulators which cannot represent PWL signals directly, the "value" part of the signal will include the derivative information (signal slope). The three-dimensional model can be useful because it allows parallel processing in the evaluation of the circuit state. In other words, if the simulator supports it, the calculation of each dimension can be separate and therefore done in parallel. This approach also assists in a mixed signal simulator where logic values are converted to analog signals.

Figure 1:
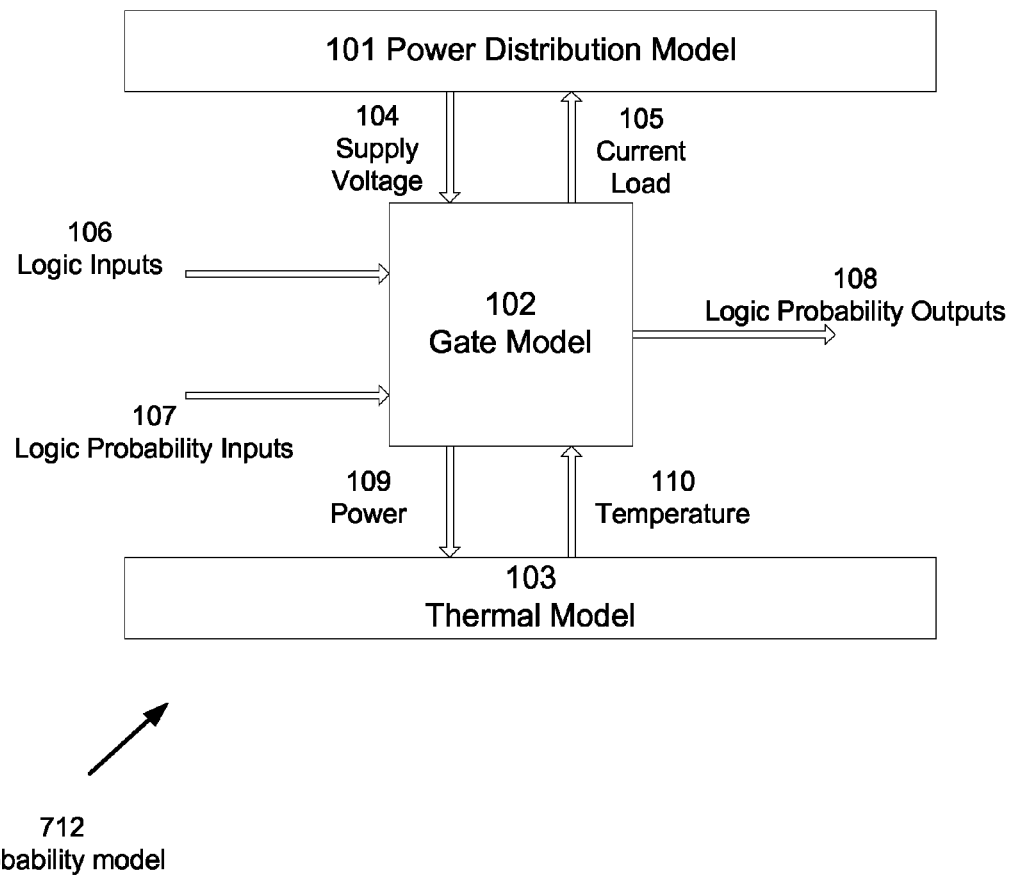
FIG. 1 is a block diagram depicting relationships between a gate model, thermal model, and power distribution model, according to one embodiment.

Referring now to FIG. 1, there is shown a block diagram depicting relationships between a gate model 102, thermal model 103, and power distribution model 101, according to one embodiment, so as to construct an overall probability model 712 that accurately simulates the operational characteristics of the actual circuit. Models 101, 102, 103 simulate possible variations in operating characteristics of the simulated circuit. Power distribution model 101 takes as input current load 105 from gate model 102, and outputs supply voltage 104, so as to provide an indication of the power distribution characteristics involved in operating the simulated circuit. Thermal model 103 simulates variations in temperature 110 based on power characteristics 109. Both power distribution model 101 and thermal model 103 are based on observed, measured, and/or theoretical characteristics of the operating environment for the circuit being simulated. Use of power distribution model 101 and/or thermal model 103 is optional.

Based on logic inputs 106 (which specify input conditions) and logic probability inputs 107 (which define behavior of system components according to the techniques described herein), gate model 102 is able to generate logic probability outputs 108 that accurately predict the operation of the circuit. In one embodiment, models 101 and 103 inform gate model 102 by supplying information about operating characteristics for the circuit; for example, gate model 102 may include parameterized definitions that are specified based on the output of models 101 and/or 103.

In one embodiment, power distribution model 101 may itself comprise any number of separate power domains, possibly run at different voltages. Probability models may be coupled with multiple power domains and may drive them with PWL voltages or logic levels as appropriate. According to various embodiments, power distribution model 101 may be a single node in the simulation so that the power signal is relayed directly to models within that domain, or it may be a network including any number of components such as resistors, capacitors, and the like.

In certain cases, such as where Verilog-AMS is used for simulation, power distribution model 101 and thermal model 103 may be described separately and combined with the use of cross-module references (XMRs), also known as out-of-module references (OOMRs) to modify voltage and temperature nodes in gate model 102. An alternative strategy in Verilog-AMS is to use C language interfaces (PLI, VPI and/or DPI) to connect with a model in some other tool.

Gate model 102 may simulate interconnections between gates as well as the gates themselves. Thus, such interconnect behavior modeling may be included as part of gate model 102. Alternatively, a separate interconnect model (not shown) can be used. An example of a scenario in which the interconnect model might be specified separately is that in which models have been generated from a pre-characterized cell library. For such pre-characterized models, some amount of interconnect behavior may be described in the pre-characterized model, but the model may be modified on a per instance basis by the use of parameters to adjust for actual conditions, such as for example the number of digital inputs and/or outputs connected to the component represented by the model (i.e., fan-in/out).

In one embodiment, interconnect models are generated automatically without any complex behavior, since the interconnects are all passive components. In one embodiment, crosstalk analysis may be incorporated if the interconnect for multiple models is combined. If there is a non-zero probability of a transition on one wire impacting a transition on another wire, for example slowing down the second transition, then the probability waveform for the second transition can be adjusted so that it takes longer to reach 1.0.

Figure 6:
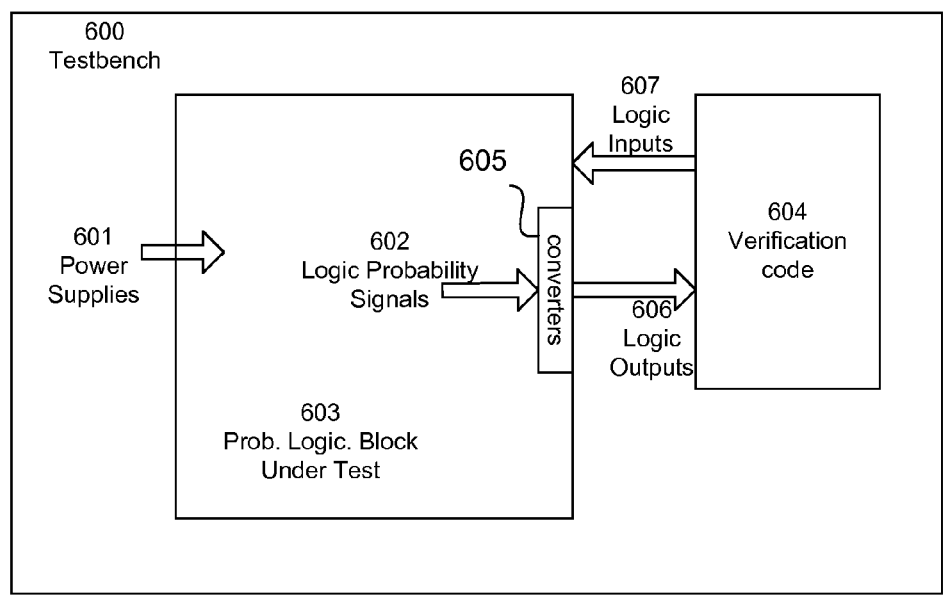
FIG. 6 is a block diagram depicting an example of the use of the present invention to test a logic block as part of a test bench, according to one embodiment.

In one embodiment, the system of the present invention is able to convert a logic probability signal back to a regular logic signal. This may be useful in cases where the logic block represented by the probability signal is part of a larger design or is mixed with other styles of simulation. Referring now to FIG. 6, there is shown an example of such a situation. As shown in the Figure, logic block 603 represents a design being tested, which generates logic probability signals 602. Test bench 600 is a parent to logic block 603. If test bench 600 is able to interpret probability logic signals 602 from logic block 603, it can directly analyze and report potential failures resulting from the interaction of logic block 603 with other components. If, on the other hand, test bench 600 is not able to interpret logic probability signals, converter(s) 605 can be provided, to convert probability signals 602 to logic signals 606. Converter(s) 605 may operate, for example, by generating 1 or 0 at certain threshold probability levels, and generating an X (representing "unknown") for probability levels between the threshold levels. Logic signals 606 can then be checked by verification code 604. Verification code 604 can drive the probabilistic block model the same way it would drive a normal design block for functional verification: converters for translating normal logic to probability signals are not essential, but could be inserted if particular timing spreads are required.

For example, if the probability threshold is set at 50%, then any observed probability value that is greater than or equal to 0.5 is converted to a 1, and any observed probability value that is less than 0.5 is converted to a 0. No X would be generated.

Alternatively, if the probability threshold is set at 0% for 0 and 100% for 1, then any probability value that lies between 0.0 and 1.0 would be converted to an X.

In one embodiment, the mode of conversion can be selected on a per-signal basis. For example, a clock signal may be converted to 1 and 0 only, using the leading edge of the probability of a transition, while data may be converted to 0 or 1 when the certainty is 100%, and X otherwise.

If a voltage is required, in one embodiment the system of the present invention can use a fraction of the supply voltage to represent the probability. If the simulation language being used employs automatic insertion of analog-to-digital and digital-to-analog conversion elements (such as, for example, Verilog-AMS), then the conversion between the probability waveform and a digital waveform can use that method and place the conversion code in the connect-modules. Other hardware description languages, such as VHDL, may support automatic type conversion at ports using user-defined functions where the conversion code can be placed.

The system of the present invention is able to check for timing errors and electromigration problems. Potential timing errors, such as for example a latch or flip-flop that requires data to be settled before a clock edge, may be reported at the time the potential error is detected, or may be accumulated for reporting at the end of simulation. In addition, converters 605 that convert probability signals 602 to logic outputs 606 may also report errors. A potential timing error may be recognized by identifying waveforms having with overlapping non-zero uncertainty levels or non-zero uncertainty at a given time. If the simulation language supports it, the checks can be implemented as assertions.

The system of the present invention is able to account for correlated and/or uncorrelated variability in circuit component characteristics. Uncorrelated variability is that which describes differences from one specific device to another; for example, such differences may be present for adjacent transistors of the same type on the same circuit. Correlated variability affects all devices equally. According to the techniques of the present invention, models may be generated to include either type of variability or both. Examples include: a model with nominal behavior and a complete spread of logic behavior; models values closer to extremes, such as specific combinations of characteristics (slowest transistors/highest temperatures, fastest transitions/lowest temperatures, leakiest transistors/highest temperatures, and the like) with variances; and/or models parameterized with correlated variables and statistical behavior that factors in those parameters.

Method

Figure 4:
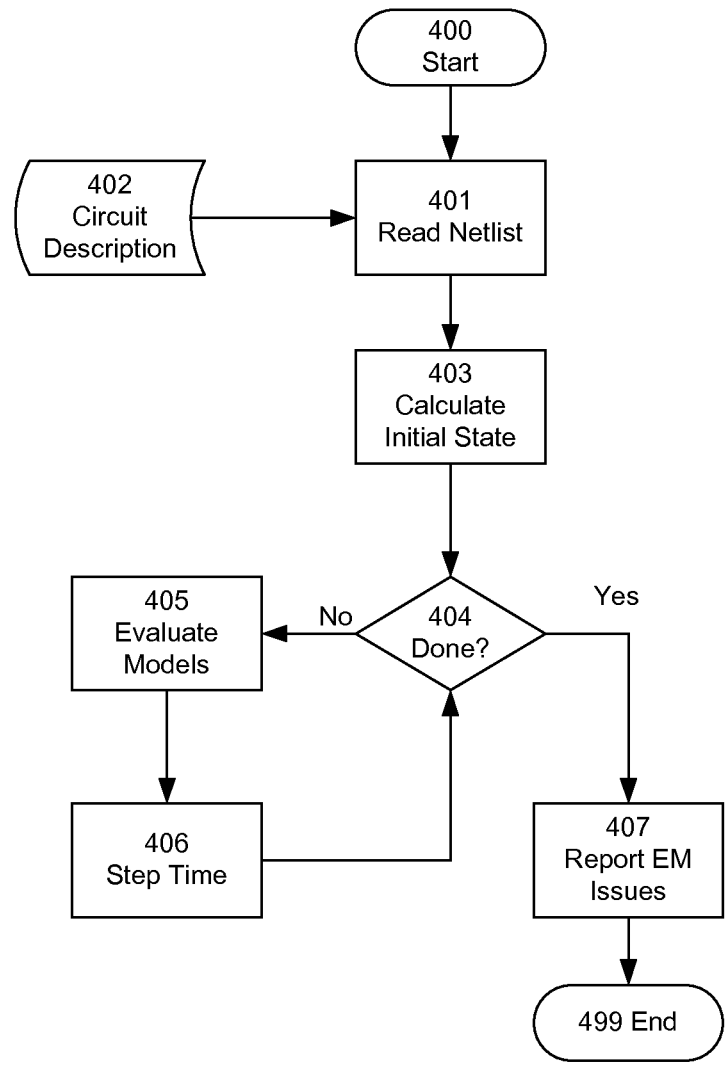
FIG. 4 is a flow diagram depicting an overview of a simulation method according to one embodiment.

Referring now to FIG. 4, there is shown a flow diagram depicting an overview of a simulation method according to one embodiment. The method may be performed by a processor of a computing system, under the direction of a simulation kernel, which is a software entity for performing circuit simulation.

The method begins 400. The system reads 401 a description 402 of the connections between components in the electrical circuit (also referred to as a "netlist"). The system calculates 403 an initial state for the circuit.

The method of FIG. 4 is able to simulate behavior of a circuit over some period of time. Accordingly, time is successively stepped forward, and the simulation models evaluated at each such step. This process is depicted in steps 404, 405, and 406.

Once the simulation is done 404, meaning the last time step has been performed, any electromigration issues are reported 407, and the method ends 499.

Figure 2:
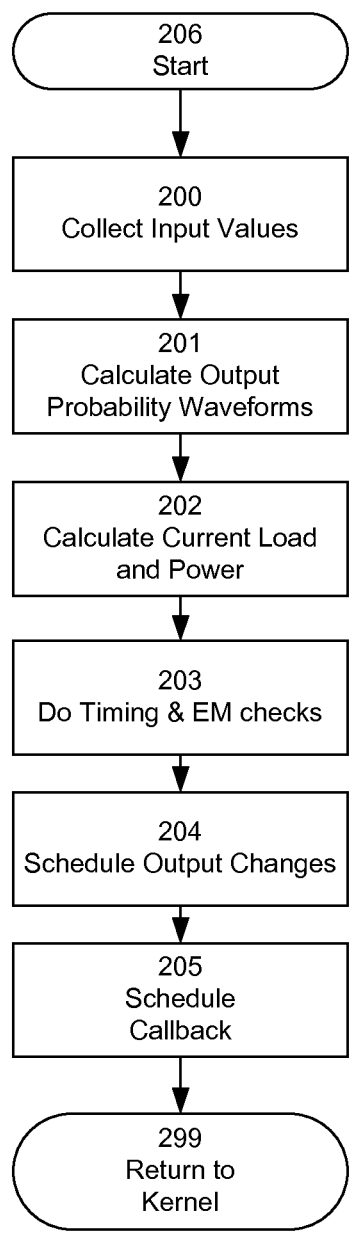
FIG. 2 is a flow diagram depicting an evaluation method according to one embodiment.

Referring now to FIG. 2, there is shown an example of an evaluation method according to one embodiment. In one embodiment, the steps of the evaluation method are performed as part of step 405 of the method of FIG. 4.

Input values are collected 200. Output probability waveforms are calculated 201 based on the characteristics of individual circuit elements, which may be statically define or parameterized. Based on the output probability waveforms, current load and power are calculated 202, and time and electromigration checks are performed 203, so as to detect any errors and/or anomalies.

If appropriate, changes are scheduled 204 so that the model can communicate with other models and update its internal state. If appropriate, a callback is scheduled 205, which is an indication to the simulation kernel that the model needs to be re-evaluated at a particular time. The method ends 299 by returning control to the simulation kernel.

Figure 9:
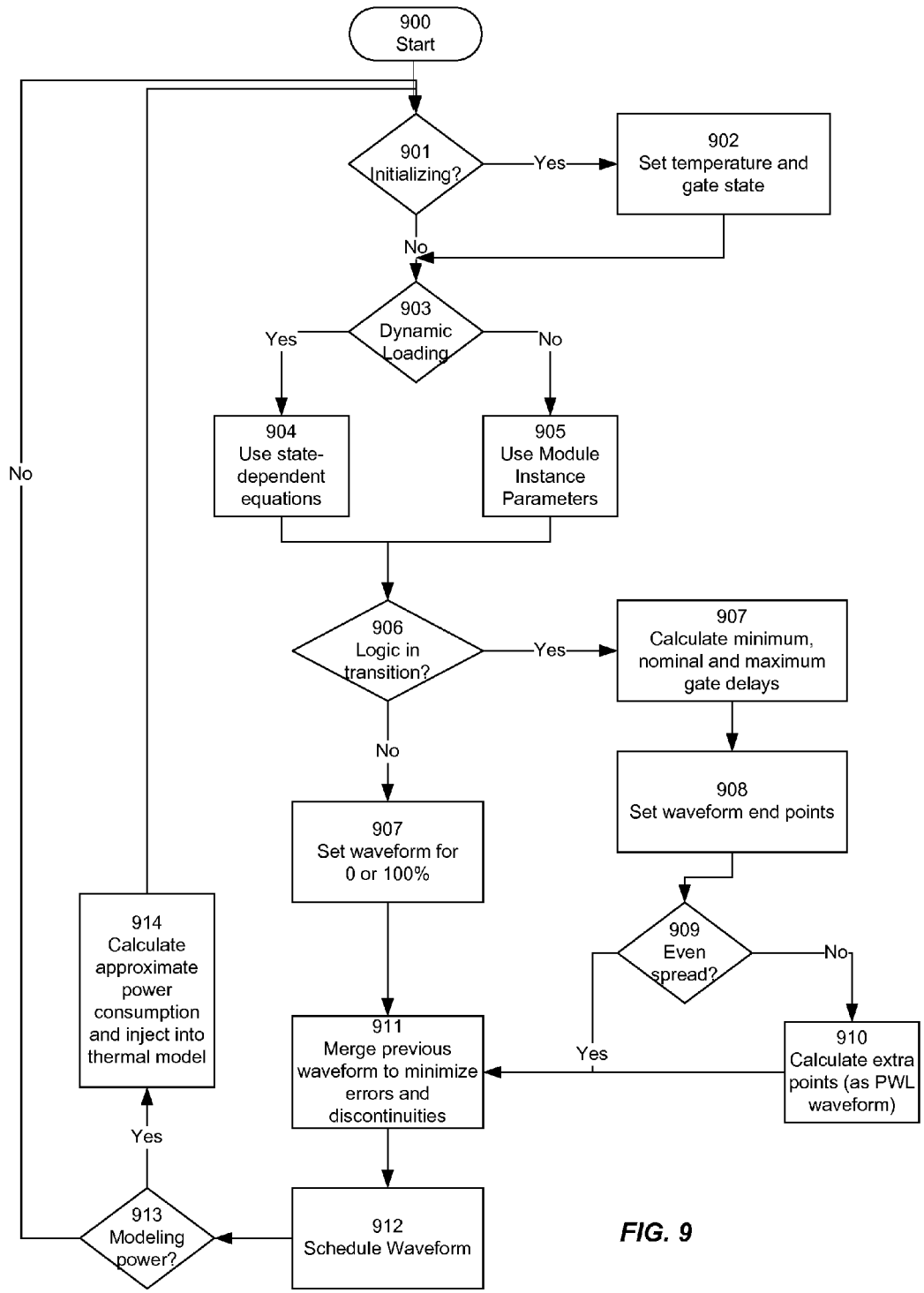
FIG. 9 is a flow diagram depicting further details of a method for simulating a circuit according to one embodiment.

Referring now to FIG. 9, there is shown a flow diagram depicting further details of a method for simulating a circuit according to one embodiment. The method may be performed by a processor of a computing system, under the direction of a simulation kernel.

If the system is initializing 901, temperature and gate state at initial conditions are set 902. In one embodiment, gate state is set to X, or "unknown". Temperature may be set to any desired value, such as for example the estimated conditions under which the physical circuit will be likely operating.

In one embodiment, the system of the present invention is able to model dynamic loading, wherein the load presented by the model on its inputs varies with the state of the circuit. The load may be represented as some mix of capacitance and resistance. Dynamic loading takes into account dependencies between models that can slow down simulation. Using constant loads makes the simulation faster, but less accurate. If dynamic loading is to be used 903, then the system obtains and applies 904 state-dependent equations to establish the characteristics of logic circuit components. Otherwise, the system uses 905 module instance parameters to establish these characteristics.

The system determines 906 whether the logical state of the circuit is in transition from one state to another. If so, it calculates 907 the minimum, nominal, and maximum gate delays for circuit components, using the established characteristics of the components as established in step 904 or 905. Waveform end points are set 908 based on the minimum and maximum gate delays. For each component, a probability waveform is established: if the probability distribution is evenly spread 909 between the waveform end points, then a simple linear interpolation is performed. If the probability distribution is not evenly spread 909, extra points are calculated 910 between the end points, so that a piecewise linear (PWL) waveform can be constructed.

If, in step 906, the logical state of the circuit is not in transition from one state to another, the probability waveform is set for 0.0 or 1.0 (0% or 100%), depending on initial state.

In one embodiment, the probability waveform is merged 911 with a previously generated waveform, so as to minimize errors and discontinuities.

The generated waveform is then scheduled 912 for modeling via simulation. If power is being modeled 913, power consumption is calculated 914 and injected into a thermal model that can be used in the simulation operation. The method then returns to step 901 or ends.

Example

Figure 10A:
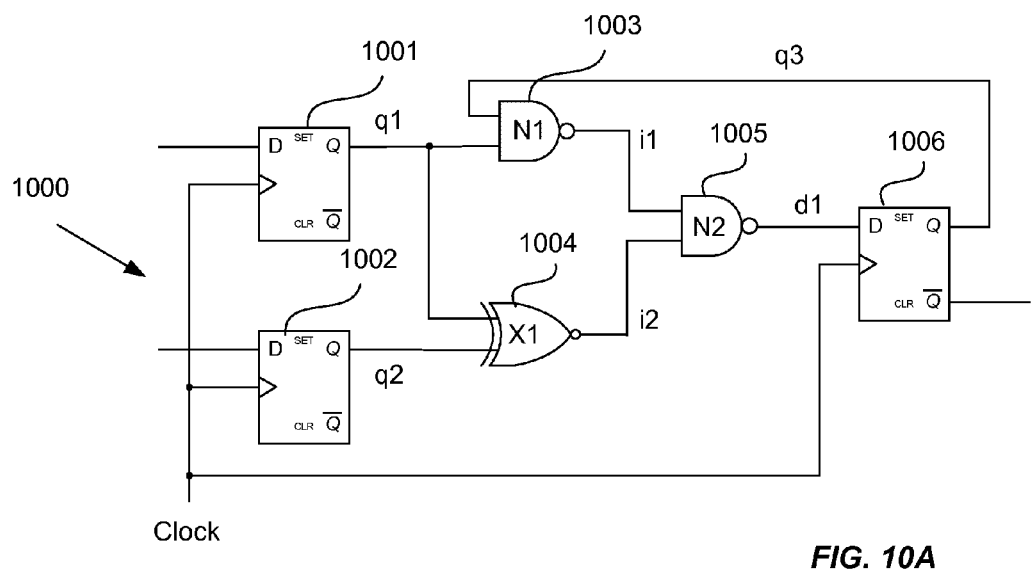
FIG. 10A depicts an example of a circuit that can be simulated using the techniques of the present invention, according to one embodiment.

Referring now to FIG. 10A, there is shown an example of a circuit 1000 that can be simulated using the techniques of the present invention, according to one embodiment. Circuit 1000 includes three latches 1001, 1002, 1006, two NAND gates 1003, 1006, and XNOR gate 1004. Output of latch 1001 is labeled q1; output of latch 1002 is labeled q2, and output of latch 1006 is labeled q3. Output of NAND gate 1003 (N1) is labeled i1; and output of NAND gate 1005 (N2) is labeled d1. Output of XNOR gate 1004 (X1) is labeled i2.

Figure 10B:
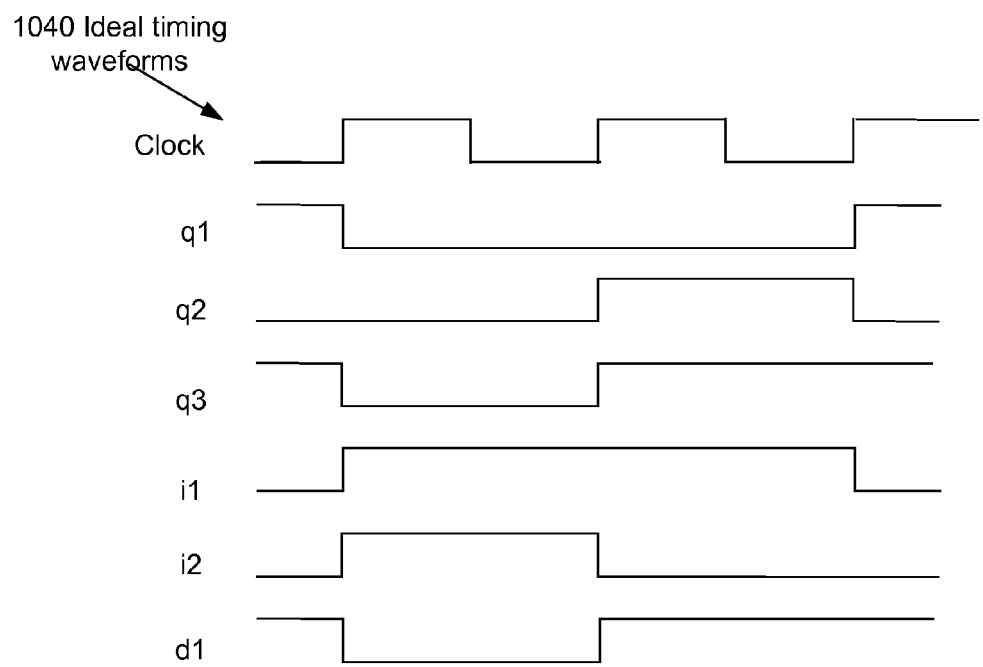
FIG. 10B depicts examples of ideal timing waveforms for the circuit of FIG. 10A.

Referring now to FIG. 10B, there are shown examples of ideal timing waveforms 1040 for the circuit of FIG. 10A, ignoring the effects of gate delay and other operational characteristics for illustrative purposes.

Figure 10C:
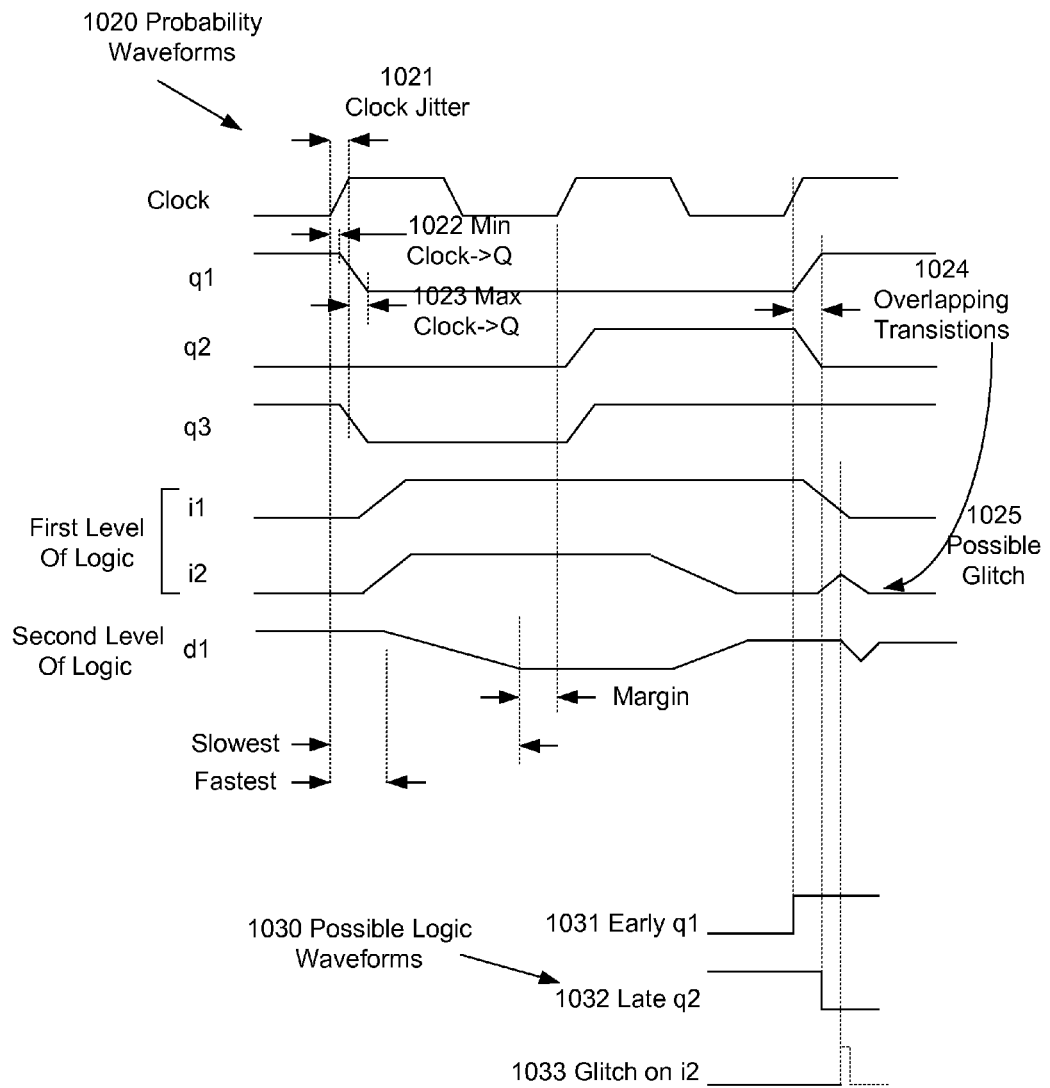
FIG. 10C depicts examples of probability waveforms for the circuit of FIG. 10A, as may be generated by a system of the present invention according to one embodiment.

Referring now to FIG. 10C, there is shown an example of a timing diagram for the circuit of FIG. 10A, as may be generated by the system of the present invention according to one embodiment. Probability waveforms 1020 are shown for the clock signal as well as for signals q1, q2, q3, i1, i2, and d1. Slopes of various probability waveforms represent uncertainty as to the precise moment at which transitions take place. For example, the slope in the waveform for the clock signal represents clock jitter 1021 that causes uncertainty as to the precise moment of transition for the clock signal. The probability spread for signal q1's transition from high to low is longer than the probability spread for the clock signal, reflecting the additional uncertainty in transition time resulting from variations in performance of latch 1001, which compounds the uncertainty from the clock signal. For example, time interval 1022 denotes the time from the earliest clock transition time, while time interval 1023 denotes the time from the latest clock transition time. Similar probability spreads are indicated for other transitions throughout the timing diagram.

FIG. 10C depicts signals i1 as a "first level of logic" and d1 as a "second level of logic". Since signal d1 is the result of more gates than signals i1 and i2, one expects the probability waveform for d1 to take longer to transition from one state to another. This occurs because of the greater variability in timing possibilities owing to the higher number of electronic components involved in generating the signal. In FIG. 10C, this greater variability is indicated as longer time periods and hence, gentler slopes between transitions. The greater variability also indicates a higher level of uncertainty as to the current state of the signal at a given time. In general, the greater the number of components involved in generating a signal, the greater the potential uncertainty as to the current state of a signal, and the gentler the slope for a portion of the probability waveform representing a transition.

Interval 1024 shows an area where transitions for q1 and q2 overlap, leading to uncertainty as to the output of XNOR gate X1 1004 (signal i2). Ideally, signals q1 and q2 transition at the same time, which would cause i2 to stay low. However, overlapping transitions 1024, as indicated by the probability waveforms for signals q1 and q2, indicate that it is possible for the transitions in signals q1 to q2 to occur at different times. This condition is indicated as a possible glitch 1025 that can be identified by the simulation techniques of the present invention.

As can be seen from the probability waveform for signal d2, glitch 1025 can propagate to other signals, with delay indicated corresponding to the earliest and latest response time for gate N2 1005.

Also shown in FIG. 10C are possible logic waveforms 1030. As described herein, the system of the present invention is able to convert a logic probability signal to a logic signal. Logic waveform 1031 depicts an instance where q1 transitions early. Logic waveform 1032 depicts an instance where q2 transitions late. Logic waveform 1033 depicts resulting glitch 1033 on signal i2 owing to the combination of the early transition of q1 and late transition of q2.

One skilled in the art will recognize that the examples depicted in FIGS. 10A, 10B, and 10C are merely illustrative, and are simplified for purposes of setting forth the general principles of the present invention. Accordingly, these examples are not intended to limit the scope of the claimed invention in any way.

Model Tuning

The system of the present invention is able to take into account variability in component characteristics, owing to manufacturing variance, environmental factors, and the like. In one embodiment, the model for a specific logic circuit may be based on template models for the circuit's components, taken from a library of standard models. Parameters for a particular instance of a circuit can then be calculated from results of simulations of various possible cases in manufacture, and/or other variable characteristics of the component. For example, various combinations of fast and slow versions of devices in the circuit can be simulated. Other variations affecting performance can also be made; for example, the simulations can be run using temperatures between the minimum operating temperature and the maximum temperature allowed. Temperature and electromigration checks can be included, so that over-temperature use is detected and reported.

Figure 5:
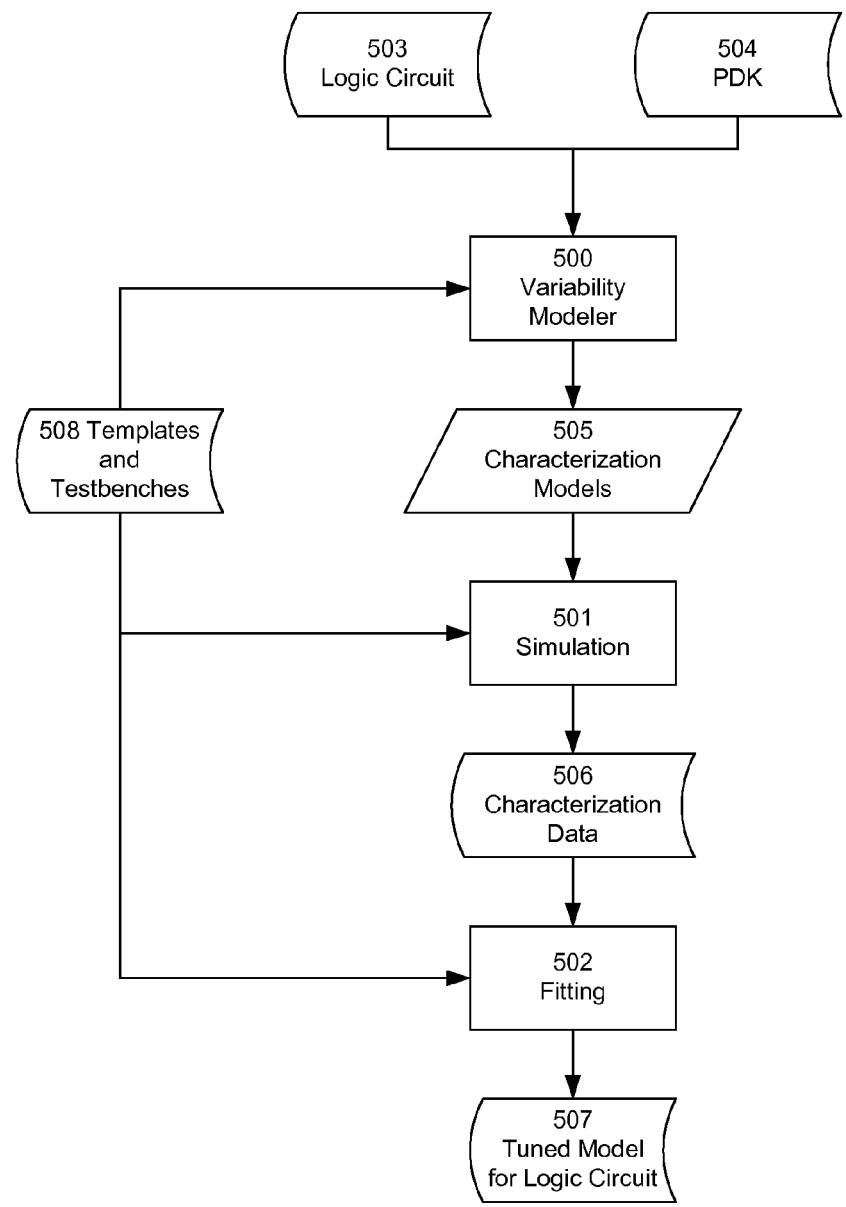
FIG. 5 is a flow diagram depicting a method for tuning a probability model according to one embodiment.

Referring now to FIG. 5, there is shown a flow diagram depicting a method for tuning a probability model 712 according to one embodiment. In model fitting, the geometries and circuit behavior are known, and the parameters in the probability model are adjusted until its behavior matches the physical circuit. Physical models will be generated to match the known geometries. The probability model fitting process attempts to set the model parameters to get the best match across those data points. Variability modeler 500, which may be implemented as a software component, takes data describing logic circuit 503, along with process design kit (PDK) 504 describing variations in characteristics of the electrical components in the circuit. Using this information, together with template and test bench data 508, variability modeler generates one or more test-case characterization models 505. Models 505 are run through simulation 501 to obtain characterization data 506 that describes the behavior of the circuit. A fitting process 502 is performed, wherein template parameters are adjusted, using data from template and test benches 508, to arrive at a tuned model 507 of the logic circuit.

Yield Calculation

In general, models used for timing simulations assume that transistors are manufactured correctly and will work to specification. According to various techniques of the present invention, probability models can be constructed to factor in the probability of point failures in the manufacturing process. Typically, such point failures cause devices to be stuck at a value of 0 or 1. Thus, the probability waveforms generated in accordance with the present invention can be configured so that they do not reach 100 or 0% for those components that have a finite possibility of being stuck at a value of 0 or 1. In other words, the component may fail in such a manner that it never reaches the logic value it is supposed to reach. Knowing the expected yield allows monitoring of the manufacturing process: for a given process there should be a predictable failure rate for components across all designs. Accordingly, once the failure rates for some designs are known, it is often possible to predict a failure rate for a new design for a given test-vector set. A failure rate that is higher than expected may be an indication that there is a problem with the process.

Electromigration (EM) Failure Prediction

The system of the present invention is able to predict electromigration failure. Specifically, in one embodiment, characterizations of circuits generated from circuit layouts can take into account the geometry of the wire elements involved in building the circuits. Current densities can thereby be calculated during simulation. If any wires appear to be at risk of electromigration, extra code can be added to the templates or interconnect models that checks for excessive currents in system simulation.

In general, electromigration failure is more likely with higher temperatures; accordingly, in one embodiment, electromigration checks can be integrated with thermal model 103.

Potential electromigration failure can be reported during or at the end of simulation, depending on how the system is configured. For example, time to failure can be predicted by taking how long any over-current lasts as a proportion of simulation time, and estimating the time the associated electromigration will take to cause a failure. This prediction can then be output as part of a report generated by the simulator software. Models can also be configured to fail (due to electromigration) so that design failure modes can be tested.

Resolved Signals

The simple logic probability waveform approach (a single time-varying real value) works where the signal is always driven. In the case where multiple gates drive a wire, it is (in simulation terms) a "resolved signal"; the simulator determines which "drivers" are active. In one embodiment, the simulator may rearrange the circuit such that the resolved signals become internal nodes to a larger model; the boundary signals (i.e., signals between models) can then be represented as simple logic signals. Alternatively, instead of rearranging the circuit, the simulator can change the signal type to include signal strength as well as the value probability. Strength can be represented asymmetrically, so that the 0 and 1 logic values can have differing strengths, and can vary depending on circuit state. Thus, strength can be represented as two real-valued waveforms—one for the strength corresponding to the 0 logic value, and another for the strength corresponding to the 1 logic value; each strength waveform represents the conductance between the output node and the corresponding 1/0 power supply. If the hardware description language supports user-defined signal types (for example, in VHDL) then the strength data can be represented as part of a user-defined signal. If user-defined signal types are not supported (for example, in Verilog), the strength data may be represented by adding extra ports to the model.

Mixed-Signal Implementation

The techniques of the present invention can be applied to analog simulation and/or mixed-signal simulation (wherein a circuit being simulated includes both analog and digital components).

Such an analog or mixed-signal simulator can handle both voltage and current on wires (also referred to as potential and flow). Probability signals 1106 can be used to represent potential or flow signals (normally used to represent voltage or current). For example, electrical potential (voltage), can be used is used as described above to represent logic probabilities, and measured return flow can be used to represent capacitive loading. Given a potential expressed as a probability waveform, the simulator generates a representation of load at a wire or lead in terms of a probability waveform. As described above, the probability waveform may be linear, piecewise linear, continuous, or of any other form.

In this manner, circuits that present different loads when in different states (as is the case with logic using transmission gates) can be factored into the behavior of the driving circuits. The circuit simulation can take into account the fact that capacitive load may be a function of supply voltage and temperature as well as circuit state, thus allowing for more accurate simulation than static timing analysis generally provides.

Examples of Models

The following is an example of a model for a two-input NAND gate. In this example, the probability waveform is linear, so that it is constructed by linear interpolation of probability values based on start and end point (earliest and latest possible transitions for the NAND gate based on changing input). Such a waveform would resemble that depicted in FIG. 11C. One skilled in the art will recognize that the following example is merely illustrative, and that a probability model could be constructed in other ways, including using other variable names, module names, and the like, without departing from the essential characteristics of the claimed invention.

Model for 2-Input NAND Gate for Even Spread (Linear Approximation)

```
nature Current
    units           = "A";
    access          = I;
endnature
nature Voltage
    units           = "V";
    access          = V;
endnature
discipline electrical
    potential Voltage;
    flow Current;
enddiscipline
nature Prob_of_1
    access          = P1;
endnature
nature Load
    access          = L;
endnature
discipline prob_sig
    potential Prob_of_1;
    flow Load;
enddiscipline
nature Temperature
    units           = "C";
    access          = Temp;
endnature
nature Power
    units           = "W";
```

```
        access                  = Pwr;
endnature
discipline thermal
    potential Temperature;
    flow Power;
enddiscipline
module nand_2pE(in1, in2, out);
    input        in1, in2;              // logic inputs
    output       out;                   // logic output
    prob_sig     out,                   // probability of 1 out
                                        // load back
                 in1,in2;               // inputs of same type
    thermal      T;                     // operating temperature(node)
    electrical   Vdd,Vss;               // power supply
    // parameters - overridden on instantiation or by defparam
    parameter
             real  in1_0_load = 0.0,    // in1 load for logic 0
                   in1_1_load = 0.0,    // in1 load for logic 1
                   in2_0_load = 0.0,    // in2 load for logic 0
                   in2_1_load = 0.0,    // in2 load for logic 1
                   internal_load = 0.0,
                   temp       = 30.0,   // default temp (C)
                   tune[ ]              = 'DEFAULT_NAND_2_TUNING;
    parameter
           integer pos_1 = -1,          // totem pole position
                   pos_2 = -1;
    real       v_logic,
               prob_next,
               time_next,
               time_start;
    branch (out) dry; // flow through this is the load
    analog begin
       @(initial_step) begin
          gate state = 0.5;             // unknown
          Temp(T)   <+ temp;            // start at default temperature
       end
       v_logic = Vdd – Vss;
       L(out) <+internal_load;    // minimum load
       // set load of inputs
'ifdef CONSTANT_LOADS
       L(in1)       <+ (in1_0_load + in1_1_load) /2;
       L(in2)       <+ (in2_0_load + in2_1_load) /2;
'else
       L(in1)       <+ LoadFnNand(P1(in1),T,in1_0_load,in1_1_load,
                                  v_logic,P1(out),pos 1, /* of */ 2);
       L(in2)       <+ LoadFnNand(P1(in2),T,in2_0_load,in2_1_load,
                                  v_logic,P1(out),pos 2, /* of */ 2);
'endif
       ProbFn2Input(prob_next,time_start,time_step,
                    P1(out),T,L(drv),v_logic,tune,
                    P1(in1),ddt(P1(in1)),
                    P1(in2),ddt(P1(in2)));
       P1(drv) <+ transition(prob_next,time_delay,time_next);
'ifdef DO_THERMAL_MODELING
       Pwr(T) <+ PowerFn2inp(P1(out),T,v_logic);
                     // to thermal model by cross-module reference
'endif
    end
endmodule
analog function ProbFn2Input;
  output prob_1,
         start,
         step;
  input gate_state,
        temperature,
        load,
        vdd,
          [0:15]tuning,
        in1, in1_ddt,
        in2, in2_ddt;
  real    gate_state, temperature, load, vdd, tuning[0:12],
          in1, in1_ddt, in2, in2_ddt, prob_1, step;
  real prob 1,                   // final logic value
        gate_dly,                // nominal delay
        max_dly,                 // maximum gate delay
        sigma;                   // spread coefficient
  integer in_trans = 0;
  if (AnyZeros(in1,in2)) then begin
     prob_1 = 1.0;
  end else begin
```

```
        // Curve fittng matches end points at 1.0/0.0,
          // but not asymptotically
        prob_1 = GateFinalVal2Input(in1,in2,tuning[0:3]);
        // limit it here
        if (prob_1 >= 1.0)
          prob_1 = 1.0;
        else if (prob_1 <= 0.0)
          prob_1 = 0.0;
        else begin
          in_trans = 1; // between limits
        end
      end
    gate_dly = tuning[4]; // nominal gate delay
    sigma = tuning[5]; // not used
    start = 0.0; // immediate (default)
    if (in_trans) then begin
      if (gate_state ==0.0 | | gate_state ==1.0) then
        // no change until minimum gate delay
        start = GateDelay(gate_dly,temperature,vdd,load,gate_state,
                                              tuning[6:10]);
      end
    end
      max_dly = GateDelay(gate_dly,temperature,vdd,load,gate_state,
                                              tuning[11:15]);
      step = max_dly – start;
    endfunction
    analog function real GateDelay;
      input gate_dly,temperature,vdd,load,gate_state,
        [0:4]tuning;
      real gate_dly,temperature,vdd,load,gate_state,
        tuning[0:4];
      if (vdd <= tuning[1]) then
        GateDelay = 'INFINITE_DELAY;                          // no power
      else
        GateDelay = gate_delay * load                         // nominal
  * tuning[0] * vdd/ (vdd – tuning[1])                        // Vdd
      adjustment
                            * tuning [2] * (gate_state + tuning[3]);  // State
adj.
                            * (gate_state + tuning[4]);
endfunction
``` nand_2pE takes two logic inputs in1, in2 and generates a logic output out. prob_sig represents a probability of a value of 1.0 at out. Various parameters can be defined, including load values for logic signals 0 and 1 at each of the inputs, internal load, tuning, totem pole position, power supply voltage, operating temperature, and the like.

In the above example, output values are determined by measured by determining the load at drv. Load at each of the inputs can be assumed to be constant (if CONSTANT_LOADS is asserted), or load can vary by some function (LoadFnNand) depending on probability values of the inputs themselves, the state of the gate itself (taken from the state of its output P1(out)), the power supply (v_logic), instance parameters ( . . . _load), and the like.

ProbFn2Input generates the probability waveform by specifying values for various points in time. P1 used on the left-hand-side of "<+" is an access function that places the probability waveform on the wire in the simulation, it can be read back by using P1 in expressions. The L access function is used in a similar manner to add load, the accumulated load is measured by asking for "L(drv)"—this is similar to the branch "drv" being a voltage source (between "out" and ground) and the load being the current through it. As shown in the example, thermal modeling can be included using PowerFn2inp.

gate_dly specifies a nominal gate delay. sigma specifies a spread factor, but this is not used in the linear interpolation.

prob_1 is a final probability value for the output of the gate, given inputs in1 and in2 and given the characteristics of the gate.

GateDelay determines an earliest transition time 1104 (start) and a latest transition time 1105 (max_dly) based on gate_dly and further based on any number of factors, including for example temperature, voltage, load, gate state, tuning, and the like. Any suitable algorithm can be used for calculating transition times 1104, 1105 based on these and/or other factors.

The method performs linear interpolation to construct the probability waveform based on the earliest and latest transition times 1104, 1105.

The following is an example of a model for a two-input NAND gate with a centered spread, using piecewise linear approximation. In this example, the probability waveform is constructed from successive linear segments, each generated using linear interpolation. Such a waveform would resemble that depicted in FIG. 11D. One skilled in the art will recognize that the following example is merely illustrative, and that a probability model could be constructed in other ways, including using other variable names, module names, and the like, without departing from the essential characteristics of the claimed invention.

Model for 2-Input NAND Gate for Centered Spread (PWL Approximation)

```
module nand_2pC(in1,in2,out);
   inout                in1,in2;               // logic inputs
   output               out;                   // logic output
   prob_sig             out,                   // probability of 1 out
                                               // load back
                        in1,in2;               // inputs of same type
   thermal              T;                     // operating temperature (node)
   electrical Vdd,Vss; // power supply
   // parameters - overridden on instantiation or by defparam
   parameter
                  real  in1_0_load           = 0.0,        // in1 load for logic 0
                        in1_1_load           = 0.0,        // in1 load for logic 1
                        in2_0_load           = 0.0,        // in2 load for logic 0
                        in2_1_load           = 0.0,        // in2 load for logic 1
                        internal_load        = 0.0,
                        temp                 = 30.0,       // default temp (C)
                        tune []              = 'DEFAULT_NAND2_TUNING;
   parameter
                  integer pos_1              = -1,         // totem pole position
                        pos_2                = -1;
   real                  v_logic,
                         prob_next,
                         time_next,
                         time_start,
                         times[6],values[6];               // PWL time/value pairs
   branch (out) drv; // flow through this is the load
   analog begin
     @ (initial_step) begin
       gate state            = 0.5;           // unknown
       Temp(T)              <+temp;           // start at default temperature
     end
     v_logic =Vdd - Vss;
     L(out) <+internal load; // minimum load
     // set load of inputs
   'ifdef CONSTANT_LOADS
      L(in1)        <+  (in1_0_load + in1_1_load) /2;
      L(in2)        <+  (in2_0_load + in2_1_load) /2;
   'else
      L(in1) ,      <+  LoadFnNand(P1(in1),T,in1_0_load,in1_1_load
                                   v_logic,P1(out),pos_1, /* of */ 2);
      L(in2)        <+  LoadFnNand(P1(in2),T,in2_0_load,in2_1_load,
                                   v_logic,P1(out),pos_2, /* of */ 2);
   'endif
      ProbFn2Input(time,values,
                           P1(out),T,L(drv),v_logic,tune,
                           P1(in1),ddt(P1(in1)),
                           P1(in2),ddt(P1(in2)));
      P1(drv)       <+  pwl(times,values);
   'ifdef DO_THERMAL_MODELING
      Pwr(T)        <+  PowerFn2inp(P1(out),T,v_logic);
                         // to thermal model by cross-module reference
   'endif
    end
   endmodule
   analog function ProbFn2Input;
      inout    times[6],
         values[6];
      input    gate_state,
         temperature,
         load,
         vdd,
            [0:15]tuning,
         in1, in1_ddt,
         in2, in2_ddt;
      real    gate_state, temperature, load, vdd, tuning[0:12],
            in1, in1_ddt, in2, in2_ddt;
      real    prob_1,                         // final logic value
            gate_dly,                         // nominal delay
            max_dly,                          // maximum gate delay
            sigma,                            // spread coefficient
            old_t[6],
            old_v[6];
      integer in_trans = 0;
      old_t = times;
      old_v = values;
      if (AnyZeros(in1,in2)) then begin
        prob 1           = 1.0;
```

```
end else begin
  // Curve fittng matches end points at 1.0/0.0,
  // but not asymptotically
  prob_1 =GateFinalVal2Input(in1,in2,tuning[0:3]);
  // limit it here
  if (prob_1         >= 1.0)
    prob_1           = 1.0;
  else if (prob_1 <0.0)
    prob_1           = 0.0;
  else begin
    in_trans         = 1; // between limits
  end
end
gate_dly       = tuning[4];    // nominal gate delay
sigma          = tuning[5];    // spread factor
start          = GateDelay(gate_dly,temperature,vdd,load,gate_state,
                                                              tuning[6:10]);
max_dly = GateDelay(gate_dly,temperature,vdd,load,gate state,
                                                              tuning[11:15]);
times[0]       = $realtime( );                  // now
values[0]      = gate_state;
times[1]       = times [0] + start;             // start
values[1]      = gate_state;
times[3]       = times [0] + gate_dly           // nominal
values[3]      = (gate_state + prob_1) /2;
times[5]       = times [0] + max_dly;           // endpoint
values[5]      = prob_1
FixSpread24(sigma,times,values);                // generate time/value data for
slots 2 & 4
MergePWL(times,values,                          // Merge new PWL waveform with
old to
                              old_t,old_v);     // prevent discontinuities
endfunction
``` gate_dly specifies a nominal gate delay. sigma specifies a spread factor. GateDelay determines an earliest transition time 1104 (start) and a latest transition time 1105 (max_dly) based on gate_dly and further based on any number of factors, including for example temperature, voltage, load, gate state, tuning, and the like. Any suitable algorithm can be used for calculating transition times 1104, 1105 based on these and/or other factors.

prob__1 is a final probability value for the output of the gate, given inputs in1 and in2 and given the characteristics of the gate.

The method performs piecewise linear interpolation to construct the probability waveform. times[0] is set based on the actual current time. times[1] and times[5] are set to absolute times representing earliest and latest transition times 1104, 1105, by adding start and max_dly, respectively, to times [0]. times[3] is set to the nominal transition time by adding gate_dly to times[0]. In this example, the piecewise linear interpolation is performed using five points in time (times[1] through times[5]), although the techniques of the present invention can be used with any number of points in time.

values[ ] represents the probability value at various points along the waveform. values[0], corresponding to the actual current time, is set based on the current state of the gate. values[1], corresponding to the earliest transition time 1104, is assumed to be equal to the current state of the gate for illustrative purposes. values[5], corresponding to the latest transition time 105, is set based on the final probability value for the output of the gate prob__1, which normally approaches or equals 0.0 or 1.0 (but may differ from 0.0 or 1.0 in cases where the simulation takes into account the possibility of gate failure where the gate never reaches the correct state).

values[3], corresponding to nominal transition time times [3], is set to the average between the start probably value values[1] and the final probability value values[5].

values[2] and values [4] are set based on interpolation, based on the spread as specified by sigma. In one embodiment, spread is determined using for example Monte Carlo analysis of the component and/or other techniques for determining the characteristics of the component.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, having instructions for causing a processor in a computing device or other electronic device to perform the above-described techniques. Some examples of nontransitory computer-readable storage media are memory devices, tapes, disks, integrated circuits, and servers. The instructions of the computer program code are operational when executed by the processor to direct the processor to operate in accord with the invention.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" "displaying" or "determining" determining or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, desktop computer, laptop computer, tablet computer, consumer electronic device, television, set-top box, or the like. An electronic device for implementing the present invention may use any operating system such as, for example, Microsoft Windows, available from Microsoft Corporation of Redmond, Wash., or Mac OS X, available from Apple Inc. of Cupertino, Calif., or iOS, available from Apple Inc. of Cupertino, Calif., or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for simulating an electronic circuit having a plurality of circuit components, comprising:

at a processor, for at least one circuit component, generating at least one continuous probability function specifying a probability of detecting a particular output value for the circuit component as a function of time, given a transition in an input value for the circuit component;

at the processor, applying the at least one generated continuous probability function to a proposed input signal value, in order to generate a prediction of performance of the simulated electronic circuit; and at an output device, outputting the generated prediction;

wherein each continuous probability function for each circuit component specifies a probability of a particular output across a range of response times for the circuit component.

2. The computer-implemented method of claim 1, wherein:
generating a continuous probability function for at least one circuit component comprises generating a plurality of continuous probability functions for a plurality of circuit components;
the method further comprising:
at the processor, obtaining a topology for the simulated electronic circuit, the topology specifying at least one connection between an input of at least one circuit component and an output of at least one circuit component; and
at the processor, combining the generated continuous probability functions for the circuit components according to the obtained topology, to generate an overall continuous probability function for the simulated electronic circuit;
and wherein applying the at least one generated continuous probability function to a proposed input signal value comprises applying the generated overall continuous probability function to a proposed input signal value.

3. The computer-implemented method of claim 2, wherein combining the generated continuous probability function for the circuit components according to the obtained topology comprises:
defining at least one input for a first circuit component in terms of at least one output for a second circuit component.

4. The computer-implemented method of claim 1, further comprising:
at the processor, obtaining at least one model for predicting performance of at least a subset of the circuit components based on at least one parameter; and
at the processor, for each circuit component, determining at least one value of the at least one parameter;
and wherein generating a continuous probability function for a circuit component comprises generating a continuous probability function by applying the obtained at least one model using the at least one parameter value.

5. The computer-implemented method of claim 4, wherein the at least one model for predicting performance comprises at least one selected from the group consisting of:
a gate model for predicting performance based on characteristics of at least one logic function;
a power distribution model, for predicting performance based on power distribution; and
a thermal model, for predicting performance based on temperature.

6. The computer-implemented method of claim 1, wherein each continuous probability function for each circuit component is based on at least one selected from the group consisting of:
temperature;
operating conditions;
load;
voltage; and
current state of the circuit.

7. The computer-implemented method of claim 1, wherein the proposed input signal value comprises a representation of an electrical potential, and the generated prediction comprises a representation of electrical current in the simulated electronic circuit.

8. The computer-implemented method of claim 1, wherein the simulated electronic circuit comprises a digital circuit.

9. The computer-implemented method of claim 1, wherein the simulated electronic circuit comprises an analog circuit.

10. The computer-implemented method of claim 1, wherein the simulated electronic circuit comprises a mixed-signal circuit comprising at least one digital circuit component and at least one analog circuit component.

11. The computer-implemented method of claim 1, wherein applying the at least one generated continuous probability function to a proposed input signal value comprises converting the at least one continuous probability function to a logic signal.

12. The computer-implemented method of claim 1, wherein applying the at least one generated continuous probability function to a proposed signal value, in order to generate a prediction of performance comprises applying a potential to the simulated electronic circuit and reading the flow through the potential from the simulated electronic circuit as a measure of load.

13. A computer-implemented method for simulating an electronic circuit having a plurality of circuit components, comprising:
at a processor, for at least one circuit component, generating at least one continuous probability function specifying a probability of detecting a particular output value for the circuit component as a function of time, given a transition in an input value for the circuit component;
at the processor, applying the at least one generated continuous probability function to a proposed input signal value, in order to generate a prediction of performance of the simulated electronic circuit; and
at an output device, outputting the generated prediction;
wherein generating the at least one continuous probability function comprises defining a linear function between a first point in time representing a fastest response time and a second point in time representing a slowest response time for the circuit component.

14. A computer-implemented method for simulating an electronic circuit having a plurality of circuit components, comprising:
at a processor, for at least one circuit component, generating at least one continuous probability function specifying a probability of detecting a particular output value for the circuit component as a function of time, given a transition in an input value for the circuit component;
at the processor, applying the at least one generated continuous probability function to a proposed input signal value, in order to generate a prediction of performance of the simulated electronic circuit; and
at an output device, outputting the generated prediction;
wherein generating the at least one continuous probability function comprises defining a piecewise linear function between a first point in time representing a fastest response time and a second point in time representing a slowest response time for the circuit component.

15. The computer-implemented method of claim 14, wherein defining the piecewise linear function comprises:
determining a probability value for an intermediate point in time between the first point in time and the second point in time;
defining a first linear function between the first point in time and the intermediate point in time;
and defining a second linear function between the intermediate point in time and the second point in time.

16. The computer-implemented method of claim 15, wherein determining a probability value for an intermediate point in time comprises assigning a nominal probability value to a midpoint between the first point in time and the second point in time.

17. The computer-implemented method of claim 16, wherein assigning a nominal probability value to a midpoint comprises assigning a nominal probability based on a predicted performance for the circuit component based on a model.

18. The computer-implemented method of claim 14, wherein defining the piecewise linear function comprises:
    determining a probability value for a plurality of intermediate points in time between the first point in time and the second point in time;
    defining a first linear function between the first point in time and one of the intermediate points in time;
    defining a second linear function between another one of the intermediate points in time and the second point in time; and
    defining at least one intermediate linear function between successive intermediate points in time.

19. A computer-implemented method for simulating an electronic circuit having a plurality of circuit components, comprising:
    at a processor, for at least one circuit component, generating at least one continuous probability function specifying a probability of detecting a particular output value for the circuit component as a function of time, given a transition in an input value for the circuit component;
    at the processor, applying the at least one generated continuous probability function to a proposed input signal value, in order to generate a prediction of performance of the simulated electronic circuit; and
    at an output device, outputting the generated prediction;
    wherein generating the at least one continuous probability function comprises defining a nonlinear function between a first point in time representing a fastest response time and a second point in time representing a slowest response time for the circuit component.

20. A computer program product for simulating an electronic circuit having a plurality of circuit components, comprising:
    a nontransitory computer-readable storage medium; and
    computer program code, encoded on the medium, for causing at least one processor to perform the steps of:
        obtaining a topology for the simulated electronic circuit, the topology specifying at least one connection between an input of at least one circuit component and an output of at least one circuit component; and
        for each of a plurality of circuit components, generating a continuous probability function specifying a probability of detecting a particular output value for the circuit component as a function of time, given a transition in an input value for the circuit component;
        combining the generated continuous probability functions for the circuit components according to the obtained topology, to generate an overall continuous probability function for the simulated electronic circuit;
        applying the generated overall continuous probability function to a proposed input signal value, in order to generate a prediction of performance of the simulated electronic circuit; and
        outputting the generated prediction;
    wherein each continuous probability function for each circuit component specifies a probability of a particular output across a range of response times for the circuit component.

21. The computer program product of claim 20, wherein the computer code for combining the generated continuous probability functions for the circuit components according to the obtained topology comprises computer code for:
    defining at least one input for a first circuit component in terms of at least one output for a second circuit component.

22. The computer program product of claim 20, further comprising computer program code for causing at least one processor to perform the steps of:
    obtaining at least one model for predicting performance of at least a subset of the circuit components based on at least one parameter; and
    for each circuit component, determining at least one value of the at least one parameter;
    and wherein the computer program code for generating a continuous probability function for a circuit component comprises computer program code for generating a continuous probability function by applying the obtained at least one model using the at least one parameter value.

23. The computer program product of claim 20, wherein each continuous probability function for each circuit component is based on at least one selected from the group consisting of:
    temperature;
    operating conditions;
    load;
    voltage; and
    current state of the circuit.

24. The computer program product of claim 20, wherein the proposed input signal value comprises a representation of an electrical potential, and the generated prediction comprises a representation of electrical current in the simulated electronic circuit.

25. A computer program product for simulating an electronic circuit having a plurality of circuit components, comprising:
    a nontransitory computer-readable storage medium; and
    computer program code, encoded on the medium, for causing at least one processor to perform the steps of:
        for at least one circuit component, generating at least one continuous probability function specifying a probability of detecting a particular output value for the circuit component as a function of time, given a transition in an input value for the circuit component;
        applying the at least one generated continuous probability function to a proposed input signal value, in order to generate a prediction of performance of the simulated electronic circuit; and
        outputting the generated prediction;
    wherein each continuous probability function for each circuit component specifies a probability of a particular output across a range of response times for the circuit component.

26. A computer program product for simulating an electronic circuit having a plurality of circuit components, comprising:
    a nontransitory computer-readable storage medium; and
    computer program code, encoded on the medium, for causing at least one processor to perform the steps of:
        for at least one circuit component, generating at least one continuous probability function specifying a probability of detecting a particular output value for the circuit component as a function of time, given a transition in an input value for the circuit component;
        applying the at least one generated continuous probability function to a proposed input signal value, in order to generate a prediction of performance of the simulated electronic circuit; and
        outputting the generated prediction;

wherein the computer program code for generating each continuous probability function comprises computer program code for defining a linear function between a first point in time representing a fastest response time and a second point in time representing a slowest response time for the circuit component.

27. A computer program product for simulating an electronic circuit having a plurality of circuit components, comprising:
- a nontransitory computer-readable storage medium; and
- computer program code, encoded on the medium, for causing at least one processor to perform the steps of:
  - for at least one circuit component, generating at least one continuous probability function specifying a probability of detecting a particular output value for the circuit component as a function of time, given a transition in an input value for the circuit component;
  - applying the at least one generated continuous probability function to a proposed input signal value, in order to generate a prediction of performance of the simulated electronic circuit; and
  - outputting the generated prediction;
- wherein the computer program code for generating each continuous probability function comprises computer program code for defining a piecewise linear function between a first point in time representing a fastest response time and a second point in time representing a slowest response time for the circuit component.

28. The computer program product of claim 27, wherein the computer program code for defining the piecewise linear function comprises computer program code for:
- determining a probability value for an intermediate point in time between the first point in time and the second point in time;
- defining a first linear function between the first point in time and the intermediate point in time;
- and defining a second linear function between the intermediate point in time and the second point in time.

29. The computer program product of claim 28, wherein the computer program code for determining a probability value for an intermediate point in time comprises computer program code for assigning a nominal probability value to a midpoint between the first point in time and the second point in time.

30. The computer program product of claim 27, wherein the computer program code for defining the piecewise linear function comprises computer program code for:
- determining a probability value for a plurality of intermediate points in time between the first point in time and the second point in time;
- defining a first linear function between the first point in time and one of the intermediate points in time;
- defining a second linear function between another one of the intermediate points in time and the second point in time; and
- defining at least one intermediate linear function between successive intermediate points in time.

31. A computer program product for simulating an electronic circuit having a plurality of circuit components, comprising:
- a nontransitory computer-readable storage medium; and
- computer program code, encoded on the medium, for causing at least one processor to perform the steps of:
  - for at least one circuit component, generating at least one continuous probability function specifying a probability of detecting a particular output value for the circuit component as a function of time, given a transition in an input value for the circuit component;
  - applying the at least one generated continuous probability function to a proposed input signal value, in order to generate a prediction of performance of the simulated electronic circuit; and
  - outputting the generated prediction;
- wherein the computer program code for generating each continuous probability function comprises computer program code for defining a nonlinear function between a first point in time representing a fastest response time and a second point in time representing a slowest response time for the circuit component.

32. A system for simulating an electronic circuit having a plurality of circuit components, comprising:
- a circuit simulator, for:
  - for at least one circuit component, generating at least one continuous probability function specifying a probability of detecting a particular output value for the circuit component as a function of time, given a transition in an input value for the circuit component; and
  - applying the at least one generated continuous probability function to a proposed input signal value, in order to generate a prediction of performance of the simulated electronic circuit; and
- an output device, coupled to the circuit simulator, for outputting the generated prediction;
- wherein each continuous probability function for each circuit component specifies a probability of a particular output across a range of response times for the circuit component.

33. The system of claim 32, wherein:
- the circuit simulator generating at least one continuous probability function for at least one circuit component comprises the circuit simulator generating a plurality of continuous probability functions for a plurality of circuit components;
- the circuit simulator obtains a topology for the simulated electronic circuit, the topology specifying at least one connection between an input of at least one circuit component and an output of at least one circuit component; and
- the circuit simulator combines the generated continuous probability functions for the circuit components according to the obtained topology, to generate an overall continuous probability function for the simulated electronic circuit;
- and wherein the circuit simulator applies the generated continuous probability functions to a proposed input signal by applying the generated overall continuous probability function to a proposed input signal value.

34. The system of claim 32, wherein the circuit simulator generates each continuous probability function by defining a piecewise linear function between a first point in time representing a fastest response time and a second point in time representing a slowest response time for the circuit component.

35. A system for simulating an electronic circuit having a plurality of circuit components, comprising:
- a circuit simulator, for:
  - for at least one circuit component, generating at least one continuous probability function specifying a probability of detecting a particular output value for the circuit component as a function of time, given a transition in an input value for the circuit component; and
  - applying the at least one generated continuous probability function to a proposed input signal value, in order to generate a prediction of performance of the simulated electronic circuit; and an output device, coupled to the circuit simulator, for outputting the generated prediction;

wherein the circuit simulator generates each continuous probability function by defining a linear function between a first point in time representing a fastest response time and a second point in time representing a slowest response time for the circuit component.

* * * * *